US 11,306,232 B2

(12) United States Patent
Rached

(10) Patent No.: US 11,306,232 B2
(45) Date of Patent: Apr. 19, 2022

(54) TETRAFLUOROPROPENE-BASED AZEOTROPIC COMPOSITIONS

(71) Applicant: Arkema France, Colombes (FR)

(72) Inventor: Wissam Rached, Chaponost (FR)

(73) Assignee: ARKEMA FRANCE, Colombes (FR)

(*) Notice: Subject to any disclaimer, the term of this patent is extended or adjusted under 35 U.S.C. 154(b) by 0 days.

(21) Appl. No.: 16/339,903

(22) PCT Filed: Oct. 9, 2017

(86) PCT No.: PCT/FR2017/052764
§ 371 (c)(1),
(2) Date: Apr. 5, 2019

(87) PCT Pub. No.: WO2018/069620
PCT Pub. Date: Apr. 19, 2018

(65) Prior Publication Data
US 2020/0048518 A1 Feb. 13, 2020

(30) Foreign Application Priority Data
Oct. 10, 2016 (FR) .................................. 1659749

(51) Int. Cl.
C09K 5/04 (2006.01)
(52) U.S. Cl.
CPC ........ C09K 5/045 (2013.01); C09K 2205/122 (2013.01); C09K 2205/126 (2013.01); C09K 2205/22 (2013.01); C09K 2205/32 (2013.01)
(58) Field of Classification Search
CPC .............. C09K 5/045; C09K 2205/122; C09K 2205/22; C09K 2205/32; C09K 2205/126
See application file for complete search history.

(56) References Cited

U.S. PATENT DOCUMENTS

| 5,056,990 A | 10/1991 | Nakajima |
| 5,065,990 A | 11/1991 | Durfee |
| 5,363,674 A | 11/1994 | Powell |
| 5,612,299 A | 3/1997 | Short |

(Continued)

FOREIGN PATENT DOCUMENTS

| CN | 102634321 A | 8/2012 |
| CN | 102686695 A | 9/2012 |
| CN | 103415587 A | 11/2013 |
| CN | 105331422 A | 2/2016 |
| JP | 4110388 B2 | 7/2008 |
| KR | 20110029417 A * | 3/2011 |

(Continued)

OTHER PUBLICATIONS

Jabbour, T., "Classification of flammability of refrigerants based on the fundamental flame velocity" under the direction of Denis Clodic, Ecole Des Mines de Paris, Thesis, Paris, 2004 (299 pages).

(Continued)

Primary Examiner — Emmanuel E Duke
(74) Attorney, Agent, or Firm — Buchanan Ingersoll & Rooney P.C.

(57) ABSTRACT

Azeotropic compositions including between 74 and 81.5 wt.-% HFO-1324yf, between 6.5 and 10.5 wt.-% HFC-134a, and between 12 and 16 wt.-% HFC-152a, relative to the total weight of the composition, the azeotropic composition having a boiling point of between −40.00° C. and 70.00° C., at a pressure of between 0.5 and 21.0 bar abs (±0.5%). Also, the uses of the aforementioned compositions in heat transfer systems.

9 Claims, 3 Drawing Sheets

(56) References Cited

U.S. PATENT DOCUMENTS

| | | |
|---|---|---|
| 8,070,977 B2 | 12/2011 | Rached |
| 8,075,798 B2 | 12/2011 | Rached |
| 8,246,850 B2 | 8/2012 | Rached |
| 8,252,198 B2 | 8/2012 | Rached |
| 8,557,135 B2 | 10/2013 | Rached |
| 8,808,569 B2 | 8/2014 | Rached |
| 8,858,824 B2 | 10/2014 | Boussand |
| 8,858,825 B2 | 10/2014 | Guerin et al. |
| 9,011,711 B2 | 4/2015 | Rached |
| 9,028,706 B2 | 5/2015 | Rached et al. |
| 9,039,922 B2 | 5/2015 | Rached |
| 9,127,191 B2 | 9/2015 | Rached |
| 9,133,379 B2 | 9/2015 | Rached |
| 9,175,203 B2 | 11/2015 | Rached |
| 9,267,064 B2 | 2/2016 | Rached |
| 9,315,708 B2 | 4/2016 | Guerin et al. |
| 9,399,726 B2 | 7/2016 | Rached |
| 9,505,968 B2 | 11/2016 | Rached |
| 9,512,343 B2 | 12/2016 | Rached et al. |
| 9,599,381 B2 | 3/2017 | Rached |
| 9,650,551 B2 | 5/2017 | Collier et al. |
| 9,650,553 B2 | 5/2017 | Deur-Bert et al. |
| 9,663,697 B2 | 5/2017 | Rached |
| 9,676,984 B2 | 6/2017 | Guerin et al. |
| 9,683,155 B2 | 6/2017 | Deur-Bert et al. |
| 9,683,157 B2 | 6/2017 | Rached |
| 9,884,984 B2 | 2/2018 | Rached |
| 9,908,828 B2 | 3/2018 | Rached et al. |
| 9,969,918 B2 | 5/2018 | Deur-Bert et al. |
| 10,023,780 B2 | 7/2018 | Guerin et al. |
| 10,035,938 B2 | 7/2018 | Rached |
| 10,119,055 B2 | 11/2018 | Boussand |
| 10,125,296 B2 | 11/2018 | Rached |
| 10,131,829 B2 | 11/2018 | Deur-Bert et al. |
| 10,252,913 B2 | 4/2019 | Bonnet et al. |
| 10,316,231 B2 | 6/2019 | Rached |
| 10,358,592 B2 | 7/2019 | Rached |
| 10,377,935 B2 | 8/2019 | Guerin et al. |
| 10,399,918 B2 | 9/2019 | Rached |
| 10,450,488 B2 | 10/2019 | Boussand |
| 10,604,690 B2 | 3/2020 | Collier et al. |
| 10,618,861 B2 | 4/2020 | Rached |
| 10,662,357 B2 | 5/2020 | Boussand |
| 10,808,157 B2 | 10/2020 | Rached |
| 10,858,562 B2 | 12/2020 | Rached |
| 10,954,467 B2 | 3/2021 | Rached |
| 2009/0267019 A1 | 10/2009 | Yana et al. |
| 2010/0122545 A1* | 5/2010 | Minor .................. C10M 105/06 |
| | | 62/324.1 |
| 2011/0084228 A1 | 4/2011 | Rached |
| 2011/0089366 A1 | 4/2011 | Rached |
| 2011/0095224 A1 | 4/2011 | Rached |
| 2011/0186772 A1 | 8/2011 | Rached |
| 2011/0219791 A1 | 9/2011 | Rached |
| 2011/0219792 A1 | 9/2011 | Rached |
| 2011/0240254 A1 | 10/2011 | Rached |
| 2011/0284181 A1 | 11/2011 | Rached |
| 2012/0049104 A1 | 3/2012 | Rached |
| 2012/0056123 A1 | 3/2012 | Rached |
| 2012/0068104 A1 | 3/2012 | Rached et al. |
| 2012/0068105 A1 | 3/2012 | Rached et al. |
| 2012/0144857 A1* | 6/2012 | Rached .................. F25B 45/00 |
| | | 62/502 |
| 2012/0151958 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0205574 A1 | 8/2012 | Rached et al. |
| 2012/0272668 A1 | 11/2012 | Van Horn et al. |
| 2013/0061613 A1* | 3/2013 | Rached .................. C09K 5/045 |
| | | 62/77 |
| 2013/0092869 A1 | 4/2013 | Boussand |
| 2013/0099154 A1 | 4/2013 | Boussand et al. |
| 2013/0105724 A1 | 5/2013 | Boussand |
| 2013/0186114 A1 | 7/2013 | Guerin et al. |
| 2014/0008565 A1 | 1/2014 | Rached et al. |
| 2014/0024575 A1* | 1/2014 | Rached .................. C11D 7/5018 |
| | | 510/461 |
| 2014/0075969 A1* | 3/2014 | Guerin .................. C09K 5/045 |
| | | 62/77 |
| 2014/0097379 A1 | 4/2014 | Carr et al. |
| 2014/0216074 A1* | 8/2014 | Minor .................. B01F 17/0085 |
| | | 62/77 |
| 2014/0260404 A1 | 9/2014 | Verma et al. |
| 2014/0318160 A1 | 10/2014 | Rached |
| 2014/0326017 A1 | 11/2014 | Rached |
| 2015/0027146 A1 | 1/2015 | Boussand |
| 2015/0152306 A1 | 6/2015 | Rached |
| 2015/0152307 A1 | 6/2015 | Rached |
| 2015/0322317 A1* | 11/2015 | Collier .................. H01B 3/56 |
| | | 252/67 |
| 2015/0322321 A1 | 11/2015 | Deur-Bert et al. |
| 2015/0344761 A1 | 12/2015 | Rached |
| 2015/0353799 A1 | 12/2015 | Deur-Bert et al. |
| 2015/0353802 A1 | 12/2015 | Rached |
| 2016/0009555 A1 | 1/2016 | Bonnet et al. |
| 2016/0009974 A1 | 1/2016 | Benanti et al. |
| 2016/0024363 A1 | 1/2016 | Rached |
| 2016/0025394 A1 | 1/2016 | Rached |
| 2016/0115361 A1 | 4/2016 | Boussand |
| 2016/0122609 A1 | 5/2016 | Rached |
| 2016/0137895 A1* | 5/2016 | Kontomaris ........... C09K 5/045 |
| | | 62/114 |
| 2016/0194541 A1 | 7/2016 | Guerin et al. |
| 2016/0244652 A1 | 8/2016 | Rached |
| 2016/0272561 A1 | 9/2016 | Rached et al. |
| 2016/0298014 A1 | 10/2016 | Rached |
| 2016/0355718 A1 | 12/2016 | Rached |
| 2016/0376484 A1 | 12/2016 | Guerin et al. |
| 2017/0037291 A1 | 2/2017 | Rached et al. |
| 2017/0080773 A1 | 3/2017 | Rached |
| 2017/0145276 A1 | 5/2017 | Rached |
| 2017/0210960 A1 | 7/2017 | Deur-Bert et al. |
| 2017/0210962 A1 | 7/2017 | Collier et al. |
| 2017/0218241 A1 | 8/2017 | Deur-Bert et al. |
| 2017/0218242 A1 | 8/2017 | Rached |
| 2018/0086173 A1 | 3/2018 | Rached |
| 2018/0134936 A1 | 5/2018 | Rached |
| 2018/0148395 A1 | 5/2018 | Rached et al. |
| 2018/0244970 A1 | 8/2018 | Rached |
| 2018/0282603 A1 | 10/2018 | Guerin et al. |
| 2018/0327645 A1 | 11/2018 | Boussand |
| 2019/0023957 A1 | 1/2019 | Rached |
| 2019/0203094 A1 | 7/2019 | Rached |
| 2019/0249057 A1 | 8/2019 | Rached |
| 2019/0284500 A1 | 9/2019 | Rached |
| 2019/0337874 A1 | 11/2019 | Rached et al. |
| 2019/0359870 A1 | 11/2019 | Rached |
| 2019/0367789 A1 | 12/2019 | Rached |
| 2020/0216734 A1 | 7/2020 | Rached et al. |
| 2020/0407613 A1 | 12/2020 | Rached |
| 2021/0017107 A1 | 1/2021 | Deur-Bert et al. |
| 2021/0046802 A1 | 2/2021 | Rached |

FOREIGN PATENT DOCUMENTS

| | | |
|---|---|---|
| KR | 20110029417 A | 3/2011 |
| WO | 2004037913 A2 | 5/2004 |
| WO | WO 2005/068579 A1 | 7/2005 |
| WO | 2005105947 A2 | 11/2005 |
| WO | 2006094303 A2 | 9/2006 |
| WO | 2012177742 A2 | 12/2012 |

OTHER PUBLICATIONS

International Search Report (PCT/ISA/210) dated Jan. 22, 2018, by the French Patent Office as the International Searching Authority for International Application No. PCT/FR2017/052764.

(56) References Cited

OTHER PUBLICATIONS

International Search Report (PCT/ISA/210) dated Jan. 22, 2018, by the French Patent Office as the International Searching Authority for International Application No. PCT/FR2017/052765.
Joseph A. Karnaz, "Lubricant Development To Meet Lower GWP Refrigerant Challenges", International Refrigeration and Air Conditioning Conference, Jan. 1, 2014, 11 pages.
Written Opinion (PCT/ISA/237) dated Jan. 22, 2018, by the French Patent Office as the International Searching Authority for International Application No. PCT/FR2017/052764.
Written Opinion (PCT/ISA/237) dated Jan. 22, 2018, by the French Patent Office as the International Searching Authority for International Application No. PCT/FR2017/052765.
Office Action issued in Chinese Patent Application No. 201780062354.0, dated Oct. 10, 2020, China National Intellectual Property Administration, 36 pages including English-language translation.
Du, Jian, "Cooling/heating Source Systems (1$^{st}$ edition)," 2007, 3 pages (including title page, copyright page, p. 277), China Electric Power Press, CN.
U.S. Appl. No. 16/339,956, Wissam Rached, filed Apr. 5, 2019.
U.S. Appl. No. 15/297,569, Wissam Rached and Béatrice Boussand, filed Oct. 19, 2016.
U.S. Appl. No. 15/368,347, Wissam Rached, filed Dec. 2, 2016.
U.S. Appl. No. 15/809,164, Wissam Rached, filed Nov. 10, 2017.
U.S. Appl. No. 16/143,518, Wissam Rached, filed Sep. 27, 2018.
U.S. Appl. No. 16/142,492, Wissam Rached, filed Sep. 26, 2018.
U.S. Appl. No. 16/395,413, Wissam Rached, filed Apr. 26, 2019.
U.S. Appl. No. 16/477,263, Wissam Rached, filed Jul. 11, 2019.
U.S. Appl. No. 16/477,318, Wissam Rached, filed Jul. 11, 2019.
U.S. Appl. No. 16/962,143, Wissam Rached, filed Jul. 14, 2020.
U.S. Appl. No. 16/965,533, Wissam Rached, filed Jul. 28, 2020.
U.S. Appl. No. 16/965,638, Dominique Deur-Bert, Laurent Wendlinger, Béatrice Berger, filed Jul. 29, 2020.
U.S. Appl. No. 16/962,143, **Rached—See Information Below.
U.S. Appl. No. 16/965,533, **Rached—See Information Below.
U.S. Appl. No. 16/965,638, **Deur-Bert et al.—See Information Below.
Rached, Wissam, U.S. Appl. No. 16/962,143 entitled "Heat Transfer Compositions as Replacement for R-134a," filed in the U.S. Patent and Trademark Office Jul. 14, 2020.
Rached, Wissam, U.S. Appl. No. 16/965,533 entitled "Method for Cooling and/or Heating a Body or a Fluid in a Motor Vehicle," filed in the U.S. Patent and Trademark Office Jul. 28, 2020.
Deur-Bert, Dominique, et al., U.S. Appl. No. 16/965,638 entitled "Ternary Azeotropic or Quasi-Azeotropic Composition Comprising HF, 2,3,3,3-Tetrafluoropropene and 1,1,1,2,2-Pentafluoropropane," filed in the U.S. Patent and Trademark Office Jul. 29, 2020.
Office Action issued in Chinese Patent Application No. 201780062362.5, dated Jun. 22, 2020, The State Intellectual Property Office of People's Republic of China, 22 pages including English-language translation.
Guo, et al., "Research and Developments of Coolants," *Organic Chemistry in Medicines*, Jul. 2008, four pages, including pp. 88-89, Edition 1, Chapter 4, China Medical Science and Technology Press, CN.
U.S. Appl. No. 17/164,888, **Rached—See Information Below.
Rached, Wissam, U.S. Appl. No. 17/164,888 entitled "Use of Tetrafluoropropene Based Compositions," filed in the U.S. Patent and Trademark Office Feb. 2, 2021.

\* cited by examiner

TETRAFLUOROPROPENE-BASED AZEOTROPIC COMPOSITIONS

FIELD OF INVENTION

The present invention relates to tetrafluoropropene-based azeotropic compositions and their use as heat transfer fluid, especially in refrigeration, air conditioning and heat pump.

TECHNICAL BACKGROUND

The problems posed by substances that deplete the atmospheric ozone layer were discussed in Montreal, where the protocol imposing a reduction in the production and use of chlorofluorocarbons (CFCs) was signed. This protocol has been amended to eliminate the use of CFCs and extend the regulation to include other products, including hydrochlorofluorocarbons (HCFCs).

The refrigeration and air-conditioning industry has invested heavily in the substitution of these refrigerants and hydrofluorocarbons (HFCs) have thus been marketed.

In the automotive industry, the air conditioning systems of vehicles marketed in many countries have moved from a chlorofluorocarbon (CFC-12) refrigerant to hydrofluorocarbon (1,1,1,2-tetrafluoroethane: HFC-134a) refrigerant, less harmful for the ozone layer. However, in view of objectives set by the Kyoto Protocol, HFC-134a (GWP=1430) is considered to have a high warming potential. The contribution to the greenhouse effect of a fluid is quantified by a criterion, GWP (Global Warming Potential) which summarizes the warming power by taking a reference value of 1 for carbon dioxide.

Due to its non-toxic, non-flammable and a very low GWP properties, carbon dioxide has been proposed as refrigerant for air conditioning systems, replacing HFC-134a. However, the use of carbon dioxide has several disadvantages, particularly related to the very high pressure of its implementation as a refrigerant in existing devices and technologies.

Document JP 4110388 describes the use of hydrofluoropropenes of formula $C_3H_mF_n$, with m, n being an integer between 1 to 5 inclusive and m+n=6 as heat transfer fluids, particularly tetrafluoropropene and trifluoropropene.

Document WO2004/037913 discloses the use of compositions comprising at least one fluoroalkene with three or four carbon atoms, especially pentafluoropropene and tetrafluoropropene, preferably having a GWP of at most 150, as heat transfer fluids.

WO 2005/105947 teaches the addition to tetrafluoropropene, preferably 1,3,3,3-tetrafluoropropene, of a co-blowing agent such as difluoromethane (HFC-32), pentafluoroethane (HFC-125), tetrafluoroethane, difluoroethane, heptafluoropropane, hexafluoropropane, pentafluoropropane, pentafluorobutane, water and carbon dioxide.

Document number WO 2006/094303 discloses an azeotropic composition containing 70.4% weight of 2,3,3,3-tetrafluoropropene (1234yf) and 29.6% weight of 1,1,1,2-tetrafluoroethane (HFC-134a). The document equally discloses an azeotropic composition containing 91% weight of 2,3,3,3-tetrafluoropropene and 9% weight of difluoroethane (HFC-152a).

In the industrial field, the most widely used refrigeration machines are based on evaporative cooling of a liquid refrigerant. After vaporization, the fluid is compressed and then cooled in order to return to liquid state and thus continue the cycle.

Lubricating oils are necessary to ensure the proper functioning of the moving mechanical parts, and especially to ensure the lubrication of the compressor bearings.

However, the refrigerant fluid, which is in contact with the lubricant present on the moving parts, at each passage through the compressor, tends to carry a certain amount, which accompanies the refrigerant in its cycle, and is therefore found in the evaporator. To overcome this problem of oil migration, it is known to use an oil separation system, capable of purging the accumulated oil from the high pressure at the compressor outlet towards the low pressure (at the compressor inlet).

Thanks to their thermal stability and their miscibility with HFOs, especially HFO-1234, POE oils are commonly used in heat transfer systems, especially in refrigeration and/or air conditioning.

However, due to good solubility of HFO-1234 in POE oils, a problem is found on heat transfer systems having an oil separator: a relatively large amount of refrigerant remains trapped by the oil. Draining the oil induces the return of trapped refrigerant from the compressor outlet directly to the inlet of the latter. This results in a net loss of efficiency for the system, since the entire refrigerant does not perform the refrigeration cycle in its entirety, and also results in a deterioration of the lubrication of compressors, especially of screw compressors, due to lower amount of oil.

There is therefore a need for new compositions allowing in particular, to overcome at least one of the aforementioned drawbacks, and having especially a zero ODP and a GWP lower than that of existing HFCs such as R407C or R134a.

DESCRIPTION OF THE INVENTION

Figure 1:
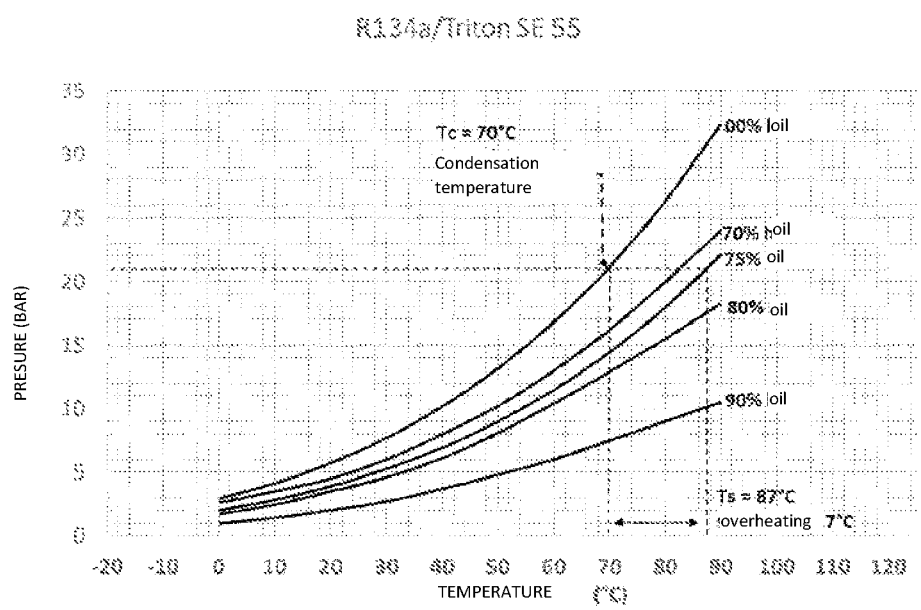
FIG. 1 is a diagram of the mixture R134a/Triton oil SE 55 representing the temperature (in ° C.) on the abscissa and on the ordinate the pressure (in bar), produced under the operating conditions of the example below. At 0% oil, 100% R134a, while 70% oil has a mixture comprising 30% R134a. This diagram shows that at constant pressure, the refrigerant concentration in the oil decreases as the temperature of the mixture Ts increases.

The present invention relates to an azeotropic composition comprising (preferably constituted) from 74 to 81.5% weight of HFO-1234yf, from 6.5 to 10.5% weight of HFC-134a, and from 12 to 16% weight of HFC-152a, in relation to the total weight of the composition, said azeotropic composition having a boiling point between −40.00° C. and 70.00° C., at a pressure between 0.5 and 21.0 bar abs (±0.5%).

According to a preferred embodiment, the azeotropic composition comprises (preferably consists of) 75.5 to 79.5% weight of HFO-1234yf, 12 to 16% weight of HFC-152a, and 6.5 to 10.5% weight of HFC-134a, in relation to the total weight of the composition, said composition having a boiling point between −40.00° C. and 70.00° C., at a pressure of between 0.5 and 21.0 bar abs (±0.5%).

Unless otherwise stated, throughout the application, the proportions of compounds indicated are given in weight percentages.

In the context of the invention, "HFO-1234yf" refers to 2,3,3,3-tetrafluoropropene.

The compositions of the invention advantageously have a zero ODP and a lower GWP than existing HFCs. Furthermore, these compositions advantageously improve the efficiency of heat transfer systems comprising an oil separator, particularly with respect to HFO-1234yf alone.

The compositions according to the invention may be prepared by any known method, for example by simple mixing the various compounds together.

Within the scope of the invention, the term "vapour saturation pressure" or "Psat vap" refers to the pressure at which the first drop of liquid begins to form in a fluid in vapour state. This pressure is also called dew pressure.

In the context of the invention, the term "liquid saturation pressure" or "Psat liq", refers to the pressure at which the first vapour bubble begins to form in a liquid state fluid. This pressure is also known as bubble pressure.

In the context of the invention, the $R_p$ percentage, calculated from the vapour and liquid saturation pressures, corresponds to the following equation:

$$Rp = \left[\frac{(Psat\ liq - Psat\ vap)}{Psat\ liq}\right] \times 100$$

In the context of the invention, a mixture is considered azeotropic when the $R_p$ percentage defined above is between 0 and 0.5%.

In the context of the invention, "between x and y" refers to an interval wherein the x and y limits are included. For example, the range "between 0 and 0.5%" includes in particular, the values 0 and 0.5%.

By way of example and in accordance with ASHRAE STANDARD 34-2013 "Design and safety classification of refrigerants", the mixtures of the table below are classified as azeotropic, according to this standard (the components, compositions and temperatures are indicated by the same standard), the pressures being calculated by Refrop 9 (Reference fluid Properties, software developed by NIST (National Institute of Standards and Technology) for the calculation of the properties of refrigerants):

| Product | Components | weight % | Temperature (° C.) | Psat Liq (bar abs) (±0.5%) | Psat vap (bar abs) (±0.5%) | RP (value rounded to the nearest tenth) |
|---|---|---|---|---|---|---|
| R500 | R12/R152a | 73.8/26.2 | 0.0 | 3.643 | 3.638 | 0.1 |
| R501 | R22/R12 | 75/25 | −41.0 | 0.996 | 0.992 | 0.4 |
| R502 | R22/R115 | 48.8/51.2 | 19.0 | 9.803 | 9.800 | 0.0 |
| R504 | R32/R115 | 48.2/51.8 | 17.0 | 15.240 | 15.229 | 0.1 |
| R507A | R125/R143a | 50/50 | −40.0 | 1.386 | 1.386 | 0.0 |
| R508A | R23/R116 | 39/61 | −86.0 | 1.111 | 1.111 | 0.0 |
| R512A | R134a/R152a | 5/95 | 10.0 | 3.728 | 3.728 | 0.0 |

This table describes in particular, azeotropically classified refrigerants showing a relative difference in saturation pressures of less than 0.50%.

Preferred azeotropic compositions according to the invention include (the pressures being calculated by Refrop 9: Software developed by NIST for the calculation of the properties of refrigerants):

| R1234yf | R134a | R152a | Temperature (° C.) | Psat Liq (bar abs) (±0.5%) | Psat vap (bar abs) (±0.5%) | RP (value rounded to the nearest tenth) |
|---|---|---|---|---|---|---|
| 77.5 | 8.5 | 14.0 | −40.00 | 0.616 | 0.614 | 0.3 |
| 77.5 | 8.5 | 14.0 | −35.00 | 0.783 | 0.781 | 0.3 |
| 77.5 | 8.5 | 14.0 | −30.00 | 0.984 | 0.982 | 0.2 |
| 77.5 | 8.5 | 14.0 | −25.00 | 1.224 | 1.221 | 0.2 |
| 77.5 | 8.5 | 14.0 | −20.00 | 1.507 | 1.504 | 0.2 |
| 77.5 | 8.5 | 14.0 | −15.00 | 1.838 | 1.835 | 0.2 |
| 77.5 | 8.5 | 14.0 | −10.00 | 2.223 | 2.221 | 0.1 |
| 77.5 | 8.5 | 14.0 | −5.00 | 2.668 | 2.665 | 0.1 |
| 77.5 | 8.5 | 14.0 | 0.00 | 3.178 | 3.176 | 0.1 |
| 77.5 | 8.5 | 14.0 | 5.00 | 3.759 | 3.757 | 0.1 |
| 77.5 | 8.5 | 14.0 | 10.00 | 4.418 | 4.416 | 0.0 |
| 77.5 | 8.5 | 14.0 | 15.00 | 5.161 | 5.158 | 0.1 |
| 77.5 | 8.5 | 14.0 | 20.00 | 5.994 | 5.991 | 0.1 |
| 77.5 | 8.5 | 14.0 | 25.00 | 6.924 | 6.921 | 0.0 |
| 77.5 | 8.5 | 14.0 | 26.97 | 7.319 | 7.316 | 0.0 |
| 77.5 | 8.5 | 14.0 | 30.00 | 7.959 | 7.956 | 0.0 |
| 77.5 | 8.5 | 14.0 | 35.00 | 9.106 | 9.102 | 0.0 |
| 77.5 | 8.5 | 14.0 | 40.00 | 10.371 | 10.367 | 0.0 |
| 77.5 | 8.5 | 14.0 | 45.00 | 11.765 | 11.760 | 0.0 |
| 77.5 | 8.5 | 14.0 | 50.00 | 13.293 | 13.288 | 0.0 |
| 77.5 | 8.5 | 14.0 | 55.00 | 14.966 | 14.960 | 0.0 |
| 77.5 | 8.5 | 14.0 | 60.00 | 16.793 | 16.786 | 0.0 |
| 77.5 | 8.5 | 14.0 | 65.00 | 18.783 | 18.775 | 0.0 |
| 77.5 | 8.5 | 14.0 | 70.00 | 20.948 | 20.938 | 0.0 |

Preferred azeotropic compositions according to the invention include the following:

| R1234yf | R134a | R152a | Temperature (° C.) | Psat Liq (bar abs) (±0.5%) | Psat vap (bar abs) (±0.5%) | RP (value rounded to the nearest tenth) |
|---|---|---|---|---|---|---|
| 77.5 | 6.5 | 16.0 | −40.00 | 0.615 | 0.613 | 0.3 |
| 77.5 | 6.5 | 16.0 | −35.00 | 0.782 | 0.779 | 0.4 |
| 77.5 | 6.5 | 16.0 | −30.00 | 0.982 | 0.979 | 0.3 |
| 77.5 | 6.5 | 16.0 | −25.00 | 1.221 | 1.218 | 0.2 |
| 77.5 | 6.5 | 16.0 | −20.00 | 1.504 | 1.501 | 0.2 |
| 77.5 | 6.5 | 16.0 | −15.00 | 1.834 | 1.831 | 0.2 |
| 77.5 | 6.5 | 16.0 | −10.00 | 2.219 | 2.216 | 0.1 |
| 77.5 | 6.5 | 16.0 | −5.00 | 2.663 | 2.660 | 0.1 |
| 77.5 | 6.5 | 16.0 | 0.00 | 3.172 | 3.169 | 0.1 |
| 77.5 | 6.5 | 16.0 | 5.00 | 3.752 | 3.749 | 0.1 |
| 77.5 | 6.5 | 16.0 | 10.00 | 4.409 | 4.406 | 0.1 |

-continued

| R1234yf | R134a | R152a | Temperature (° C.) | Psat Liq (bar abs) (±0.5%) | Psat vap (bar abs) (±0.5%) | RP (value rounded to the nearest tenth) |
|---|---|---|---|---|---|---|
| 77.5 | 6.5 | 16.0 | 15.00 | 5.150 | 5.147 | 0.1 |
| 77.5 | 6.5 | 16.0 | 20.00 | 5.981 | 5.979 | 0.0 |

| R1234yf | R134a | R152a | Temperature (° C.) | Psat Liq (bar abs) (±0.5%) | Psat vap (bar abs) (±0.5%) | RP (value rounded to the nearest tenth) |
| --- | --- | --- | --- | --- | --- | --- |
| 77.5 | 6.5 | 16.0 | 25.00 | 6.910 | 6.907 | 0.0 |
| 77.5 | 6.5 | 16.0 | 26.97 | 7.304 | 7.301 | 0.0 |
| 77.5 | 6.5 | 16.0 | 30.00 | 7.942 | 7.939 | 0.0 |
| 77.5 | 6.5 | 16.0 | 35.00 | 9.086 | 9.083 | 0.0 |
| 77.5 | 6.5 | 16.0 | 40.00 | 10.349 | 10.346 | 0.0 |
| 77.5 | 6.5 | 16.0 | 45.00 | 11.740 | 11.736 | 0.0 |
| 77.5 | 6.5 | 16.0 | 50.00 | 13.265 | 13.261 | 0.0 |
| 77.5 | 6.5 | 16.0 | 55.00 | 14.935 | 14.930 | 0.0 |
| 77.5 | 6.5 | 16.0 | 60.00 | 16.757 | 16.752 | 0.0 |
| 77.5 | 6.5 | 16.0 | 65.00 | 18.743 | 18.737 | 0.0 |
| 77.5 | 6.5 | 16.0 | 70.00 | 20.903 | 20.897 | 0.0 |

Preferred azeotropic compositions according to the invention include the following:

| R1234yf | R134a | R152a | Temperature (° C.) | Psat Liq (bar abs) (±0.5%) | Psat vap (bar abs) (±0.5%) | RP (value rounded to the nearest tenth) |
| --- | --- | --- | --- | --- | --- | --- |
| 81.5 | 6.5 | 12.0 | −40.00 | 0.619 | 0.618 | 0.2 |
| 81.5 | 6.5 | 12.0 | −35.00 | 0.787 | 0.785 | 0.3 |
| 81.5 | 6.5 | 12.0 | −30.00 | 0.988 | 0.986 | 0.2 |
| 81.5 | 6.5 | 12.0 | −25.00 | 1.228 | 1.226 | 0.2 |
| 81.5 | 6.5 | 12.0 | −20.00 | 1.511 | 1.509 | 0.1 |
| 81.5 | 6.5 | 12.0 | −15.00 | 1.842 | 1.841 | 0.1 |
| 81.5 | 6.5 | 12.0 | −10.00 | 2.228 | 2.226 | 0.1 |
| 81.5 | 6.5 | 12.0 | −5.00 | 2.672 | 2.671 | 0.0 |
| 81.5 | 6.5 | 12.0 | 0.00 | 3.182 | 3.181 | 0.0 |
| 81.5 | 6.5 | 12.0 | 5.00 | 3.763 | 3.761 | 0.1 |
| 81.5 | 6.5 | 12.0 | 10.00 | 4.420 | 4.419 | 0.0 |
| 81.5 | 6.5 | 12.0 | 15.00 | 5.162 | 5.160 | 0.0 |
| 81.5 | 6.5 | 12.0 | 20.00 | 5.993 | 5.991 | 0.0 |
| 81.5 | 6.5 | 12.0 | 25.00 | 6.922 | 6.919 | 0.0 |
| 81.5 | 6.5 | 12.0 | 26.97 | 7.316 | 7.313 | 0.0 |
| 81.5 | 6.5 | 12.0 | 30.00 | 7.954 | 7.951 | 0.0 |
| 81.5 | 6.5 | 12.0 | 35.00 | 9.097 | 9.094 | 0.0 |
| 81.5 | 6.5 | 12.0 | 40.00 | 10.359 | 10.355 | 0.0 |
| 81.5 | 6.5 | 12.0 | 45.00 | 11.748 | 11.743 | 0.0 |
| 81.5 | 6.5 | 12.0 | 50.00 | 13.272 | 13.266 | 0.0 |
| 81.5 | 6.5 | 12.0 | 55.00 | 14.939 | 14.932 | 0.0 |
| 81.5 | 6.5 | 12.0 | 60.00 | 16.759 | 16.751 | 0.0 |
| 81.5 | 6.5 | 12.0 | 65.00 | 18.742 | 18.732 | 0.1 |
| 81.5 | 6.5 | 12.0 | 70.00 | 20.898 | 20.887 | 0.1 |

Preferred azeotropic compositions according to the invention are the following:

| R1234yf | R134a | R152a | Temperature (° C.) | Psat Liq (bar abs) (±0.5%) | Psat vap (bar abs) (±0.5%) | RP (value rounded to the nearest tenth) |
| --- | --- | --- | --- | --- | --- | --- |
| 75.5 | 10.0 | 14.5 | −40.00 | 0.615 | 0.612 | 0.5 |
| 75.5 | 10.0 | 14.5 | −35.00 | 0.782 | 0.778 | 0.5 |
| 75.5 | 10.0 | 14.5 | −30.00 | 0.983 | 0.979 | 0.4 |
| 75.5 | 10.0 | 14.5 | −25.00 | 1.222 | 1.218 | 0.3 |
| 75.5 | 10.0 | 14.5 | −20.00 | 1.505 | 1.501 | 0.3 |
| 75.5 | 10.0 | 14.5 | −15.00 | 1.836 | 1.833 | 0.2 |
| 75.5 | 10.0 | 14.5 | −10.00 | 2.222 | 2.218 | 0.2 |
| 75.5 | 10.0 | 14.5 | −5.00 | 2.667 | 2.663 | 0.1 |
| 75.5 | 10.0 | 14.5 | 0.00 | 3.177 | 3.173 | 0.1 |
| 75.5 | 10.0 | 14.5 | 5.00 | 3.759 | 3.755 | 0.1 |
| 75.5 | 10.0 | 14.5 | 10.00 | 4.418 | 4.415 | 0.1 |
| 75.5 | 10.0 | 14.5 | 15.00 | 5.161 | 5.158 | 0.1 |
| 75.5 | 10.0 | 14.5 | 20.00 | 5.995 | 5.992 | 0.1 |
| 75.5 | 10.0 | 14.5 | 25.00 | 6.927 | 6.923 | 0.1 |
| 75.5 | 10.0 | 14.5 | 26.97 | 7.323 | 7.319 | 0.1 |
| 75.5 | 10.0 | 14.5 | 30.00 | 7.963 | 7.960 | 0.0 |
| 75.5 | 10.0 | 14.5 | 35.00 | 9.112 | 9.108 | 0.0 |
| 75.5 | 10.0 | 14.5 | 40.00 | 10.380 | 10.375 | 0.0 |
| 75.5 | 10.0 | 14.5 | 45.00 | 11.775 | 11.770 | 0.0 |
| 75.5 | 10.0 | 14.5 | 50.00 | 13.307 | 13.301 | 0.0 |
| 75.5 | 10.0 | 14.5 | 55.00 | 14.983 | 14.977 | 0.0 |
| 75.5 | 10.0 | 14.5 | 60.00 | 16.814 | 16.806 | 0.0 |
| 75.5 | 10.0 | 14.5 | 65.00 | 18.808 | 18.800 | 0.0 |
| 75.5 | 10.0 | 14.5 | 70.00 | 20.978 | 20.968 | 0.0 |

Preferred azeotropic compositions according to the invention are the following:

| R1234yf | R134a | R152a | Temperature (° C.) | Psat Liq (bar abs) (±0.5%) | Psat vap (bar abs) (±0.5%) | RP (value rounded to the nearest tenth) |
| --- | --- | --- | --- | --- | --- | --- |
| 77.5 | 10.5 | 12.0 | −40.00 | 0.618 | 0.615 | 0.5 |
| 77.5 | 10.5 | 12.0 | −35.00 | 0.785 | 0.783 | 0.3 |
| 77.5 | 10.5 | 12.0 | −30.00 | 0.987 | 0.984 | 0.3 |
| 77.5 | 10.5 | 12.0 | −25.00 | 1.227 | 1.224 | 0.2 |
| 77.5 | 10.5 | 12.0 | −20.00 | 1.510 | 1.508 | 0.1 |
| 77.5 | 10.5 | 12.0 | −15.00 | 1.842 | 1.840 | 0.1 |
| 77.5 | 10.5 | 12.0 | −10.00 | 2.229 | 2.226 | 0.1 |
| 77.5 | 10.5 | 12.0 | −5.00 | 2.674 | 2.672 | 0.1 |
| 77.5 | 10.5 | 12.0 | 0.00 | 3.186 | 3.183 | 0.1 |
| 77.5 | 10.5 | 12.0 | 5.00 | 3.768 | 3.766 | 0.1 |
| 77.5 | 10.5 | 12.0 | 10.00 | 4.429 | 4.426 | 0.1 |
| 77.5 | 10.5 | 12.0 | 15.00 | 5.173 | 5.170 | 0.1 |
| 77.5 | 10.5 | 12.0 | 20.00 | 6.008 | 6.005 | 0.0 |
| 77.5 | 10.5 | 12.0 | 25.00 | 6.940 | 6.937 | 0.0 |
| 77.5 | 10.5 | 12.0 | 26.97 | 7.336 | 7.332 | 0.1 |
| 77.5 | 10.5 | 12.0 | 30.00 | 7.978 | 7.974 | 0.1 |
| 77.5 | 10.5 | 12.0 | 35.00 | 9.127 | 9.122 | 0.1 |
| 77.5 | 10.5 | 12.0 | 40.00 | 10.395 | 10.390 | 0.0 |
| 77.5 | 10.5 | 12.0 | 45.00 | 11.791 | 11.785 | 0.1 |
| 77.5 | 10.5 | 12.0 | 50.00 | 13.324 | 13.316 | 0.1 |
| 77.5 | 10.5 | 12.0 | 55.00 | 15.000 | 14.992 | 0.1 |
| 77.5 | 10.5 | 12.0 | 60.00 | 16.831 | 16.821 | 0.1 |
| 77.5 | 10.5 | 12.0 | 65.00 | 18.826 | 18.815 | 0.1 |
| 77.5 | 10.5 | 12.0 | 70.00 | 20.996 | 20.983 | 0.1 |

According to a preferred embodiment, the azeotropic composition according to the invention comprises (preferably consists of) 75.5% to 81.5% weight of HFO-1234yf, 14%-16% weight of HFC-152a and 6.5% to 10.5% weight of HFC-134a, in relation to the total weight of the composition, said composition having a boiling point of between −40.00° C. and 70.00° C. at a pressure of between 0.5 and 21.0 bar abs (±0.5%).

According to a preferred embodiment, the azeotropic composition according to the invention comprises (preferably consists of) 76% to 79% weight of HFO-1234yf, 12%-15% weight of HFC-152a and 7% to 9% weight of HFC-134a, in relation to the total weight of the composition, said composition having a boiling point of between −40.00° C. and 70.00° C. at a pressure of between 0.5 and 21.0 bar abs (±0.5%).

According to a preferred embodiment, the azeotropic composition according to the invention comprises (preferably consists of) 77.5% (±0.2%) weight of HFO-1234yf, 14% (±0.2%) weight of HFC-152a and 8.5% (±0.2%) weight of HFC-134a, in relation to the total weight of the composition, said composition having a boiling point of between −40.00° C. and 70.00° C. at a pressure of between 0.5 and 21.0 bar abs (±0.5%).

According to a preferred embodiment, the azeotropic composition according to the invention comprises (preferably consists of) 77.5% (±0.2%) weight of HFO-1234yf, 14% (±0.2%) weight of HFC-152a and 8.5% (±0.2%) weight of HFC-134a, in relation to the total weight of the composition, said composition having a boiling point of 26.97° C. (±0.50° C.) at a pressure of 7.3 bar abs (±0.5%).

According to a preferred embodiment, the azeotropic composition according to the invention comprises (preferably consists of) 77.5% weight of HFO-1234yf, 16% weight of HFC-152a and 6.5% weight of HFC-134a, in relation to the total weight of the composition, said composition having a boiling point between −40.00° C. and 70.00° C., at a pressure of between 0.5 and 21.0 bar abs (±0.5%), and preferably between 0.6 and 20.9 bar abs (±0.5%).

According to a preferred embodiment, the azeotropic composition according to the invention comprises (preferably consists of) 77.5% (±0.2%) weight of HFO-1234yf, 15.8% (±0.2%) weight of HFC-152a and 6.7% (±0.2%) weight of HFC-134a, in relation to the total weight of the composition, said composition having a boiling point between −40.00° C. and 70.00° C., at a pressure between 0.5 and 21.0 bar abs (±0.5%), and preferably between 0.6 and 20.9 bar abs (±0.5%).

According to a preferred embodiment, the azeotropic composition according to the invention comprises (preferably consists of) 77.5% weight of HFO-1234yf, 16% weight of HFC-152a and 6.5% weight of HFC-134a, in relation to the total weight of the composition, said composition having a boiling temperature of 26.97° C. (±0.50° C.) at a pressure of 7.3 bar abs (±0.5%).

According to a preferred embodiment, the azeotropic composition according to the invention comprises (preferably consists of) 77.5% (±0.2%) weight of HFO-1234yf, 15.8% (±0.2%) weight of HFC-152a and 6.7% (±0.2%) weight of HFC-134a, in relation to the total weight of the composition, said composition having a boiling point of 26.97° C. (±0.50° C.) at a pressure of 7.3 bar abs (±0.5%).

According to a preferred embodiment, the azeotropic composition according to the invention comprises (preferably consists of) 81.5% weight of HFO-1234yf, 12% weight of HFC-152a and 6.5% weight of HFC-134a, in relation to the total weight of the composition, said composition having a boiling point between −40.00° C. and 70.00° C., at a pressure of between 0.5 and 21.0 bar abs (±0.5%), and preferably between 0.6 and 20.9 bar abs (±0.5%).

According to a preferred embodiment, the azeotropic composition according to the invention comprises (preferably consists of) 81.5% weight of HFO-1234yf, 12% weight of HFC-152a and 6.5% weight of HFC-134a, in relation to the total weight of the composition, said composition having a boiling temperature of 26.97° C. (±0.50° C.) at a pressure of 7.3 bar abs (±0.5%).

According to a preferred embodiment, the azeotropic composition according to the invention comprises (preferably consists of) 75.5% (±0.2%) weight of HFO-1234yf, 14.5% (±0.2%) weight of HFC-152a and 10% (±0.2%) weight of HFC-134a, in relation to the total weight of the composition, said composition having a boiling point between −40.00° C. and 70.00° C., at a pressure between 0.5 and 21.0 bar abs (±0.5%), and preferably between 0.78 and 20.98 bar abs (±0.5%).

According to a preferred embodiment, the azeotropic composition according to the invention comprises (preferably consists of) 75.5% (±0.2%) weight of HFO-1234yf, 14.5% (±0.2%) weight of HFC-152a and 10% (±0.2%) weight of HFC-134a, in relation to the total weight of the composition, said composition having a boiling point of 26.97° C. (±0.50° C.) at a pressure of 7.3 bar abs (±0.5%).

According to a preferred embodiment, the azeotropic composition according to the invention comprises (preferably consists of) 77.5% weight of HFO-1234yf, 12% weight of HFC-152a and 10.5% weight of HFC-134a, in relation to the total weight of the composition, said composition having a boiling point between −40.00° C. and 70.00° C., at a pressure of between 0.5 and 21.0 bar abs (±0.5%), and preferably between 0.61 and 21.00 bar abs (±0.5%).

According to a preferred embodiment, the azeotropic composition according to the invention comprises (preferably consists of) 77.5% (±0.2%) weight of HFO-1234yf, 12.2% (±0.2%) weight of HFC-152a and 10.3% (±0.2%) weight of HFC-134a, in relation to the total weight of the composition, said composition having a boiling point between −40.00° C. and 70.00° C., at a pressure between 0.5 and 21.0 bar abs (±0.5%), and preferably between 0.61 and 21.00 bar abs (±0.5%).

According to a preferred embodiment, the azeotropic composition according to the invention comprises (preferably consists of) 77.5% weight of HFO-1234yf, 12% weight of HFC-152a and 10.5% weight of HFC-134a, in relation to the total weight of the composition, said composition having a boiling temperature of 26.97° C. (±0.50° C.) at a pressure of 7.3 (±0.5%).

According to a preferred embodiment, the azeotropic composition according to the invention comprises (preferably consists of) 77.5% (±0.2%) weight of HFO-1234yf, 12.2% (±0.2%) weight of HFC-152a and 10.3% (±0.2%) weight of HFC-134a, in relation to the total weight of the composition, said composition having a boiling point of 26.97° C. (±0.50° C.) at a pressure of 7.3 bar abs (±0.5%).

Heat Transfer Fluid Composition

According to one embodiment, the azeotropic composition of the invention is a heat transfer fluid.

The azeotropic composition according to the invention may comprise one or more additives (which are essentially not heat transfer compounds for the intended application).

The additives may especially be selected from nanoparticles, stabilizers, surfactants, tracer agents, fluorescent agents, odourizing agents, lubricants and solubility agents.

"Heat transfer compound", respectively "heat transfer fluid" or "refrigerant" refers to a compound, respectively a fluid, capable of absorbing heat by evaporating at low temperature and low pressure and of rejecting heat by condensing at high temperature and high pressure, in a vapour compression circuit. In general, a heat transfer fluid may comprise one, two, three or more than three heat transfer compounds.

"Heat transfer composition" refers to a composition comprising a heat transfer fluid and optionally one or more additives that are not heat transfer compounds for the intended application.

The present invention also relates to a heat transfer composition comprising (preferably consisting of) the azeotropic composition according to the above-mentioned invention, and at least one additive especially selected from nanoparticles, stabilizers, surfactants, tracer agents, fluorescent agents, odourizing agents, lubricants and solubilisers. Preferably, the additive is selected from lubricants, especially polyol ester-based lubricants.

The stabilizer (s), when present, preferably represent at most 5% by weight in the heat transfer composition. Examples of the stabilizers, include in particular, nitromethane, ascorbic acid, terephthalic acid, azoles such as tolutriazole or benzotriazole, phenol compounds such as tocopherol, hydroquinone, t-butyl hydroquinone, 2,6-di-tert-butyl-4-methylphenol, epoxides (optionally fluorinated or perfluorinated alkyl or alkenyl or aromatic) such as n-butyl glycidyl ether, hexanediol diglycidyl ether, allyl glycidyl ether, butylphenylglycidyl ether, phosphites, phosphonates, thiols and lactones.

As nanoparticles, in particular it is possible to use nanoparticles of carbon, metal oxides (copper, aluminium), $TiO_2$, $Al_2O_3$, $MoS_2$ . . . .

Examples of (detectable) tracer agents include deuterated or non-deuterated hydrofluorocarbons, deuterated hydrocarbons, perfluorocarbons, fluoroethers, brominated compounds, iodinated compounds, alcohols, aldehydes, ketones, nitrous oxide and combinations thereof. The tracer agent is different from the one or more heat transfer compounds that constitute the heat transfer fluid.

Examples of solubility agents, include hydrocarbons, dimethyl ether, polyoxyalkylene ethers, amides, ketones, nitriles, chlorocarbons, esters, lactones, aryl ethers, fluoroethers and 1,1,1-trifluoroalcanes. The solubility agent is different from the one or more heat transfer compounds composing the heat transfer fluid.

Examples of fluorescent agents include naphthalimides, perylenes, coumarins, anthracenes, phenanthracenes, xanthenes, thioxanthenes, naphthoxanhthenes, fluoresceins and derivatives and combinations thereof.

Examples of odourising agents include alkyl acrylates, allyl acrylates, acrylic acids, acrylesters, alkyl ethers, alkyl esters, alkynes, aldehydes, thiols, thioethers, disulphides, allyl isothiocyanates and alkanoic acids, amines, norbornenes, norbornene derivatives, cyclohexene, heterocyclic aromatic compounds, ascaridole, o-methoxy (methyl) phenol and combinations thereof.

In the context of the invention, the terms "lubricant", "lubricant oil" and "lubricating oil" are used interchangeably.

Lubricants recommended for use include mineral oils, silicone oils, natural paraffins, naphthenes, synthetic paraffins, alkylbenzenes, poly-alpha olefins, polyalkene glycols, polyol esters, and/or polyvinyl ethers.

According to one embodiment, the lubricant is based on polyol esters. In particular, the lubricant comprises one or more polyol ester (s).

According to one embodiment, the polyol esters are obtained by reacting at least one polyol with a carboxylic acid or with a mixture of carboxylic acids.

In the context of the invention, and unless otherwise indicated, the term "polyol" means a compound containing at least two hydroxyl groups (—OH).

Polyol Esters A)

According to one embodiment, the polyol esters according to the invention have the following formula (I):

$$R^1[OC(O)R^2]_n \qquad (I)$$

wherein:
  $R^1$ is a linear or branched hydrocarbon radical, optionally substituted with at least one hydroxyl group and/or comprising at least one heteroatom selected from the group consisting of —O—, —N—, and —S—;
  each $R^2$ is, independently of each other, selected from the group consisting of:
    i) H;
    ii) an aliphatic hydrocarbon radical;
    iii) a branched hydrocarbon radical;
    iv) a mixture of a radical ii) and/or iii), with an aliphatic hydrocarbon radical comprising from 8 to 14 carbon atoms; and
  n is an integer of at least 2.

In the context of the invention, the term "hydrocarbon radical" means a radical composed of carbon atoms and hydrogen.

According to one embodiment, the polyols have the following general formula (II):

$$R^1(OH)_n \qquad (II)$$

wherein:
  $R^1$ is a linear or branched hydrocarbon radical, optionally substituted with at least one hydroxyl group, preferably with two hydroxyl groups, and/or comprising at least one heteroatom selected from the group consisting of —O—, —N—, and —S—; and
  n is an integer of at least 2.

Preferably, $R^1$ is a hydrocarbon, linear or branched radical, comprising from 4 to 40 carbon atoms, preferably from 4 to 20 carbon atoms.

Preferably, $R^1$ is a hydrocarbon, linear or branched radical comprising at least one oxygen atom.

Preferably, $R^1$ is a branched hydrocarbon radical comprising from 4 to 10 carbon atoms, preferably 5 carbon atoms, substituted by two hydroxyl groups.

According to a preferred embodiment, the polyols comprise from 2 to 10 hydroxyl groups, preferably from 2 to 6 hydroxyl groups.

The polyols according to the invention may comprise one or more oxyalkylene groups, in this particular case polyether polyols.

The polyols according to the invention may also comprise one or more nitrogen atoms. For example, the polyols may be alkanol amines containing from 3 to 6 OH groups. Preferably, the polyols are alkanol amines containing at least two OH groups, and preferably at least three.

According to the present invention, the preferred polyols are selected from the group consisting of ethylene glycol, diethylene glycol, triethylene glycol, propylene glycol, dipropylene glycol, glycerol, neopentyl glycol, 1,2-butanediol, 1,4-butanediol, 1,3-butanediol, pentaerythritol, dipentaerythritol, tripentaerythritol, triglycerol, trimethylolpropane, sorbitol, hexaglycerol, and mixtures thereof.

According to the invention, carboxylic acids can satisfy the following general formula (III):

$$R^2COOH \qquad (III)$$

wherein:
  $R^2$ is selected from the group consisting of:
    i) H;
    ii) an aliphatic hydrocarbon radical;
    iii) a branched hydrocarbon radical;
    iv) a mixture of a radical ii) and/or iii), with an aliphatic hydrocarbon radical comprising from 8 to 14 carbon atoms.

Preferably, $R^2$ is an aliphatic hydrocarbon radical comprising from 1 to 10, preferably from 1 to 7 carbon atoms, and especially from 1 to 6 carbon atoms.

Preferably, $R^2$ is a branched hydrocarbon radical comprising from 4 to 20 carbon atoms, especially from 5 to 14 carbon atoms, and preferably from 6 to 8 carbon atoms.

According to a preferred embodiment, a branched hydrocarbon radical has the following formula (IV):

$$—C(R^3)R^4)(R^5) \qquad (IV)$$

wherein $R^3$, $R^4$ and $R^5$ are, independently of each other, an alkyl group, and at least one of the alkyl groups contains at least two carbon atoms. Such branched alkyl groups, once bound to the carboxyl group, are known as "neo group", and the corresponding acid as "neo acid". Preferably, $R^3$ and $R^4$ are methyl groups and $R^{10}$ is an alkyl group comprising at least two carbon atoms.

According to the invention, the $R^2$ radical may comprise one or more carboxy groups, or ester groups such as —COOR$^6$, with $R^6$ representing an alkyl radical, hydroxyalkyl radical or a hydroxyalkyloxy alkyl group.

Preferably, the acid $R^2COOH$ of formula (III) is a monocarboxylic acid.

Examples of carboxylic acids among which the aliphatic hydrocarbon radical include: formic acid, acetic acid, propionic acid, butyric acid, pentanoic acid, hexanoic acid and heptanoic acid.

Examples of carboxylic acids among which the hydrocarbon-based branched radical include: 2-ethyl-n-butyric acid, 2-hexyldecanoic acid, isostearic acid, 2-methylhexanoic acid, 2-methylbutanoic acid, 3-methylbutanoic acid, 3,5,5-trimethylhexanoic acid, 2-ethylhexanoic acid, neoheptanoic acid, and neodecanoic acid.

The third type of carboxylic acids which can be used in the preparation of the polyol esters of formula (I) are carboxylic acids comprising an aliphatic hydrocarbon radical containing from 8 to 14 carbon atoms. For example: decanoic acid, dodecanoic acid, lauric acid, stearic acid, myristic acid, behenic acid, . . . . Examples of the dicarboxylic acids include maleic acid, succinic acid, adipic acid, sebacic acid . . . .

According to a preferred embodiment, the carboxylic acids used to prepare the polyol esters of formula (I) comprise a mixture of monocarboxylic and dicarboxylic acids, the proportion of monocarboxylic acids being the majority. The presence of dicarboxylic acids results especially in the formation of polyol esters of high viscosity.

In particular, the polyol ester-forming reaction of formula (I) by reaction between the carboxylic acid and the polyols is an acid-catalysed reaction. This is mostly a reversible reaction, which can be complete by using a large amount of acid or by removing the water formed during the reaction.

The esterification reaction can be carried out in the presence of organic or inorganic acids, such as sulphuric acid, phosphoric acid . . . .

Preferably, the reaction is carried out in the absence of a catalyst.

The amount of carboxylic acid and polyol in the mixture may vary depending on the desired results. In the particular case where all the hydroxyl groups are esterified, a sufficient amount of carboxylic acid must be added to react with all the hydroxyls.

According to one embodiment, when using mixtures of carboxylic acids, these can react sequentially with the polyols.

According to a preferred embodiment, when using a mixture of carboxylic acids, a polyol reacts first with a carboxylic acid, typically the highest molecular weight carboxylic acid, followed by reaction with the carboxylic acid with an aliphatic hydrocarbon chain.

According to one embodiment, the esters can be formed by reaction between the carboxylic acids (or their anhydride or ester derivatives) with the polyols, in the presence of acids at high temperature, while removing the water formed during the reaction. Typically, the reaction can be carried out at a temperature of 75 to 200° C.

According to another embodiment, the polyol esters formed may comprise unreactive hydroxyl groups, in this case they are esters of partially esterified polyols.

According to a preferred embodiment, the polyol esters are obtained from pentaerythritol alcohol, and from a mixture of carboxylic acids: isononanoic acid, at least one acid having an aliphatic hydrocarbon radical comprising from 8 to 10 carbon atoms, and heptanoic acid. The preferred polyol esters are obtained from pentaerythritol, and a mixture of 70% of isononanoic acid, 15% of at least one carboxylic acid with an aliphatic hydrocarbon radical comprising from 8 to 10 carbon atoms, and 15% heptanoic acid. For example, Solest 68 oil sold by CPI Engineering Services Inc. may be cited.

Polyol Esters B)

According to another embodiment, the polyol esters of the invention comprise at least one ester of one or more branched carboxylic acids comprising at most 8 carbon atoms. The ester is mostly obtained by reacting said branched carboxylic acid with one or more polyols.

Preferably, the branched carboxylic acid comprises at least 5 carbon atoms. In particular, the branched carboxylic acid comprises from 5 to 8 carbon atoms, and preferably it contains 5 carbon atoms.

Preferably, the above-mentioned branched carboxylic acid does not comprise 9 carbon atoms. In particular, said carboxylic acid is not 3,5,5-trimethylhexanoic acid.

According to a preferred embodiment, the branched carboxylic acid is selected from 2-methylbutanoic acid, 3-methylbutanoic acid, and mixtures thereof.

In a preferred embodiment, the polyol is selected from the group consisting of neopentyl glycol, glycerol, trimethylol propane, pentaerythritol, dipentaerythritol, tripentaerythritol, and mixtures thereof.

According to a preferred embodiment, the polyol esters are obtained from:
 i) a carboxylic acid selected from 2-methylbutanoic acid, 3-methylbutanoic acid, and mixtures thereof; and
 ii) a polyol selected from the group consisting of neopentyl glycol, glycerol, trimethylolpropane, pentaerythritol, dipentaerythritol, tripentaerythritol, and mixtures thereof.

Preferably, the polyol ester is that obtained from 2-methylbutanoic acid and pentaerythritol.

Preferably, the polyol ester is that obtained from 2-methylbutanoic acid and dipentaerythritol.

Preferably, the polyol ester is that obtained from 3-methylbutanoic acid and pentaerythritol.

Preferably, the polyol ester is that obtained from 3-methylbutanoic acid and dipentaerythritol.

Preferably, the polyol ester is that obtained from 2-methylbutanoic acid and neopentyl glycol.

Polyol Esters C)

According to another embodiment, the polyol esters according to the invention are poly (neopentylpolyol) esters obtained by:
 i) reaction of a neopentylpolyol with the following formula (V):

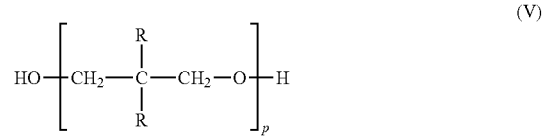

wherein:
each R represents, independently of each other, $CH_3$, $C_2H_5$ or $CH_2OH$;

p is an integer between 1 and 4;

with at least one monocarboxylic acid containing 2 to 15 carbon atoms, and in the presence of an acid catalyst, the molar ratio between the carboxyl groups and the hydroxyl groups being less than 1:1, to form a composition of partially esterified poly (neopentyl) polyol; and ii) reacting the partially esterified poly (neopentyl) polyol composition obtained at the end of step i) with another carboxylic acid having from 2 to 15 carbon atoms, to form the final composition of poly (neopentyl polyol) ester (s).

Preferably, reaction i) is carried out with a molar ratio ranging from 1:4 to 1:2.

Preferably, neopentyl polyol has the following formula (VI):

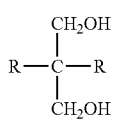

(VI)

wherein each R is, independently of each other, $CH_3$, $C_2H_5$ or $CH_2OH$.

Preferred neopentyl polyols are those selected from pentaerythritol, dipentaerythritol, tripentaerythritol, tetraerythritol, trimethylolpropane, trimethylolethane, and neopentyl glycol. In particular, the neopentyl polyol is pentaerythritol.

Preferably, a single neopentyl polyol is used to produce the POE-based lubricant. In some cases, two or more neopentyl polyols are used. This is particularly the case when a commercial product of pentaerythritol includes small amounts of dipentaerythritol, tripentaerythritol, and tetraerythritol.

According to a preferred embodiment, the above mentioned monocarboxylic acid comprises from 5 to 11 carbon atoms, preferably from 6 to 10 carbon atoms.

Monocarboxylic acids have in particular, the following general formula (VII):

R'C(O)OH          (VII)

in which R' is a linear or branched C1-C12 alkyl radical, a C6-C12 aryl radical or a C6-C30 aralkyl radical. Preferably, R' is a C4-C10 alkyl radical, and preferentially a C5-C9 alkyl radical.

In particular, the monocarboxylic acid is selected from the group consisting of butanoic acid, pentanoic acid, hexanoic acid, heptanoic acid, n-octanoic acid, n-nonanoic acid, n-decanoic acid, 3-methylbutanoic acid, 2-methylbutanoic acid, 2,4-dimethylpentanoic acid, 2-ethylhexanoic acid, 3,3,5-trimethylhexanoic acid, benzoic acid, and mixtures thereof.

According to a preferred embodiment, the monocarboxylic acid is n-heptanoic acid, or a mixture of n-heptanoic acid with another linear monocarboxylic acid, in particular n-octanoic acid and/or n-decanoic acid. Such a mixture of monocarboxylic acid may comprise between 15 and 100 mol % of heptanoic acid and between 85 and 0 mol % of other monocarboxylic acid(s). In particular, the mixture comprises between 75 and 100 mol % of heptanoic acid, and between 25 and 0 mol % of a mixture of octanoic acid and decanoic acid in a molar ratio 3:2.

According to a preferred embodiment, polyol esters comprise:

i) from 45% to 55% weight of a monopentaerythritol ester with at least one monocarboxylic acid having from 2 to 15 carbon atoms;

ii) less than 13% weight of a dipentaerythritol ester with at least one monocarboxylic acid having from 2 to 15 carbon atoms;

iii) less than 10% weight of a tripentaerythritol ester with at least one monocarboxylic acid having 2 to 15 carbon atoms; and iv) at least 25% weight of a tetraerythritol ester and other pentaerythritol oligomers, with at least one monocarboxylic acid having from 2 to 15 carbon atoms.

Polyol Esters D)

According to another embodiment, the polyol esters according to the invention have the following formula (VIII):

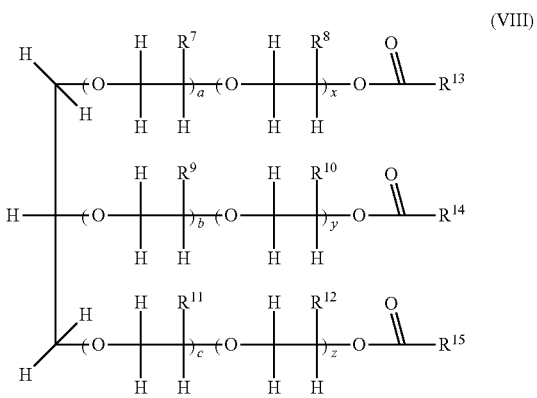

wherein:
$R^7$, $R^8$, $R^9$, $R^{10}$, $R^{11}$ and $R^{12}$ are, independently of each other, H or $CH_3$;

a, b, c, y, x and z are, independently of each other, an integer;

a+x, b+y, and c+z are, independently of each other, integers ranging from 1 to 20;

$R^{13}$, $R^{14}$ and $R^{15}$ are, independently of each other, selected from the group consisting of aliphatic or branched alkyls, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryls and cycloalkylarylalkyls, R13, $R^{14}$ and $R^{15}$, ranging from 1 to 17 carbon atoms, and capable of being optionally substituted.

According to a preferred embodiment, $R^{13}$, $R^{14}$ and $R^{15}$ each represents, independently of each other, a linear or branched alkyl group, an alkenyl group, a cycloalkyl group, said alkyl, alkenyl or cycloalkyl groups may comprise at least one heteroatom selected from N, O, Si, F or S. Preferably, $R^{13}$, $R^{14}$ and $R^{15}$ have, each independently of each other, from 3 to 8 carbon atoms, preferably from 5 to 7 carbon atoms.

Preferably, a+x, b+y, and c+z are, independently of one another, integers ranging from 1 to 10, preferably from 2 to 8, and even more preferably from 2 to 4.

Preferably, $R^7$, $R^8$, $R^9$, $R^{10}$, $R^{11}$ and $R^{12}$ represent H.

The polyol esters of formula (VIII) above can typically be prepared as described in paragraphs [0027] to [0030] of international application WO2012/177742.

In particular, the polyol esters of formula (VIII) are obtained by esterification of glycerol alkoxylates (as described in paragraph [0027] of WO2012/177742) with one or more monocarboxylic acids having from 2 to 18 carbon atoms.

According to a preferred embodiment, the monocarboxylic acids have one of the following formulas:

$R^{13}COOH$ $R^{14}COOH$ and $R^{15}COOH$ wherein $R^{13}$, $R^{14}$ and $R^{15}$ are as defined above. Derivatives of the carboxylic acids can also be used, such as anhydrides, esters and acyl halides.

Esterification can be carried out with one or more monocarboxylic acids. Preferred monocarboxylic acids are those selected from the group consisting of acetic acid, propanoic acid, butyric acid, isobutanoic acid, pivalic acid, pentanoic acid, isopentanoic acid, hexanoic acid, heptanoic acid, octanoic acid, 2-ethylhexanoic acid, 3,3,5-trimethylhexanoic acid, nonanoic acid, decanoic acid, neodecanoic acid, undecanoic acid, dodecanoic acid, tridecanoic acid, myristic acid, pentadecanoic acid, palmitic acid, stearic acid, oleic acid, linoleic acid, palmitoleic acid, citronellic acid, undecenoic acid, lauric acid, undecylenic acid, linolenic acid, arachidic acid, behenic acid, tetrahydrobenzoic acid, hydrogenated or non-hydrogenated abietic acid, 2-ethylhexanoic acid, furoic acid, benzoic acid, 4-acetylbenzoic acid, pyruvic acid, 4-tert-butyl-benzoic acid, naphthenic acid, 2-methyl benzoic acid, salicylic acid, their isomers, their methyl esters, and mixtures thereof.

Preferably, the esterification is carried out with one or more monocarboxylic acids selected from the group consisting of pentanoic acid, 2-methylbutanoic acid, n-hexanoic acid, n-heptanoic acid, 3,3,5-trimethylhexanoic acid, 2-ethylhexanoic acid, n-octanoic acid, n-nonanoic acid and isononanoic acid.

Preferably, the esterification is carried out with one or more monocarboxylic acids selected from the group consisting of butyric acid, isobutyric acid, n-pentanoic acid, 2-methylbutanoic acid, 3-methylbutanoic acid, n-hexanoic acid, n-heptanoic acid, n-octanoic acid, 2-ethylhexanoic acid, 3,3,5-trimethylhexanoic acid, n-nonanoic acid, decanoic acid, undecanoic acid, undecylenic acid, lauric acid, stearic acid, isostearic acid, and mixtures thereof.

According to another embodiment, the polyol esters according to the invention have the following formula (IX):

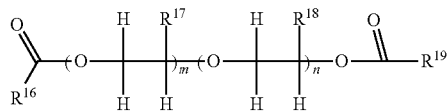

wherein:
each of $R^{17}$ and $R^{18}$, is, independently of each other, H or $CH_3$;
each of m and n is, independently of each other, an integer, with m+n being an integer from 1 to 10;
$R^{16}$ and $R^{19}$ are, independently of each other, selected from the group consisting of aliphatic or branched aliphatic or branched alkyls, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryls and cycloalkylarylalkyls,
$R^{16}$ and $R^{19}$, ranging from 1 to 17 carbon atoms, and capable of being optionally substituted.

According to a preferred embodiment, each of $R^{16}$ and $R^{19}$ each represents, independently of one another, a linear or branched alkyl group, an alkenyl group, a cycloalkyl group, said alkyl, alkenyl or cycloalkyl groups may comprise at least one heteroatom selected from N, O, Si, F or S Preferably, each of $R^{16}$ and $R^{19}$ has, independently of each other, from 3 to 8 carbon atoms, preferably from 5 to 7 carbon atoms.

According to a preferred embodiment, $R^{17}$ and $R^{18}$ each represents H, and/or m+n is an integer ranging from 2 to 8, from 4 to 10, from 2 to 5, or from 3 to 5. In particular, m+n is 2, 3 or 4.

According to a preferred embodiment, the polyol esters of formula (IX) above are triethylene glycol diesters, tetraethylene glycol diesters, in particular with one or two monocarboxylic acids having from 4 to 9 carbon atoms.

The polyol esters of formula (IX) above may be prepared by esterifications of an ethylene glycol, a propylene glycol, or an oligo- or polyalkylene glycol, (which may be an oligo- or polyethylene glycol, oligo- or polypropylene glycol, or an ethylene glycol-propylene glycol block copolymer), with one or two monocarboxylic acids comprising 2 to 18 carbon atoms. The esterification can be carried out identically to the esterification reaction used to prepare the polyol esters of formula (VIII) above.

In particular, monocarboxylic acids identical to those used to prepare the polyol esters of formula (VIII) above can be used to form the polyol esters of formula (IX).

According to one embodiment, the lubricant based on polyol esters according to the invention comprises from 20 to 80%, preferably from 30 to 70%, and preferably from 40 to 60% weight of at least one polyol ester of formula (VIII), and from 80 to 20%, preferably from 70 to 30%, and preferably from 60 to 40% weight of at least one polyol ester of formula (IX).

In general, certain alcohol functional groups cannot be esterified during the esterification reaction, however, their proportion remains low. Thus, the POE can comprise between 0 and 5% relative weight ratio of $CH_2OH$ in relation to $-CH_2-O-C(=O)-$.

Preferred POE lubricants according to the invention are those having a viscosity between 1 to 1000 centiStokes (cSt) at 40° C., preferably from 10 to 200 cSt, even more preferably from 20 to 100 cSt, and advantageously from 30 to 80 cSt.

The international classification of oils is particularly provided by 1503448-1992 (NF T60-141) and according to which oils are designated by their average viscosity class measured at a temperature of 40° C.

According to one embodiment, the azeotropic composition content in the heat transfer composition according to the invention ranges from 1 to 5% weight; or 5 to 10%; or 10 to 15%; or 15 to 20%; or from 20 to 25%; or 25 to 30%; or from 30 to 35%; or 35 to 40%; or 40 to 45%; or 45 to 50%; or 50 to 55%; or 55 to 60%; or from 60 to 65%; or from 65 to 70%; or 70 to 75%; or from 75 to 80%; or from 80 to 85%; or from 85 to 90%; or from 90 to 95%; or from 95 to 99%; or from 99 to 99.5%; or from 99.5 to 99.9%; or more than 99.9%, based on the total weight of the heat transfer composition. The content of azeotropic composition according to the invention may also vary in several of the above ranges: for example from 50 to 55%, and from 55 to 60%, meaning from 50 to 60%, etc.

According to a preferred embodiment, the heat transfer composition comprises more than 50% weight of azeotropic composition according to the invention, and in particular, from 50% to 99% weight, in relation to the total weight of the heat transfer composition.

In the heat transfer composition according to the invention, the mass proportion of the lubricant, especially polyol ester (POE) based lubricants can represent especially, from 1 to 5% of the composition; or from 5 to 10% of the composition; or from 10 to 15% of the composition; or from 15 to 20% of the composition; or from 20 to 25% of the composition; or from 25 to 30% of the composition; or from 30 to 35% of the composition; or from 35 to 40% of the composition; or from 40 to 45% of the composition; or from 45 to 50% of the composition; or from 50 to 55% of the composition; or from 55 to 60% of the composition; or from 60 to 65% of the composition; or from 65 to 70% of the composition; or from 70 to 75% of the composition; or from 75 to 80% of the composition; or from 80 to 85% of the composition; or from 85 to 90% of the composition; or from 90 to 95% of the composition; or from 95 to 99% of the composition; or from 99 to 99.5% of the composition; or from 99.5 to 99.9% of the composition; or more than 99.9% of the composition. The lubricant content may also vary in several of the above ranges: for example from 50 to 55%, and from 55 to 60%, meaning from 50 to 60%, etc.

According to one embodiment, the transfer composition comprises (preferably consists of):
the azeotropic composition according to the invention comprising (preferably consists of) 77.5% (±0.2%) weight of HFO-1234yf, 14% (±0.2%) weight of HFC-152a and 8.5% (±0.2%) weight of HFC-134a, said composition having a boiling point of 26.97° C. (±0.50° C.) at a pressure of 7.3 bar abs (±0.5%); and
at least one lubricant based on polyol esters (POE), especially selected from polyol esters A), B), C) or D) described above, especially polyol esters of formulas (I), (VIII) or (XI).

Uses

Figure 2:
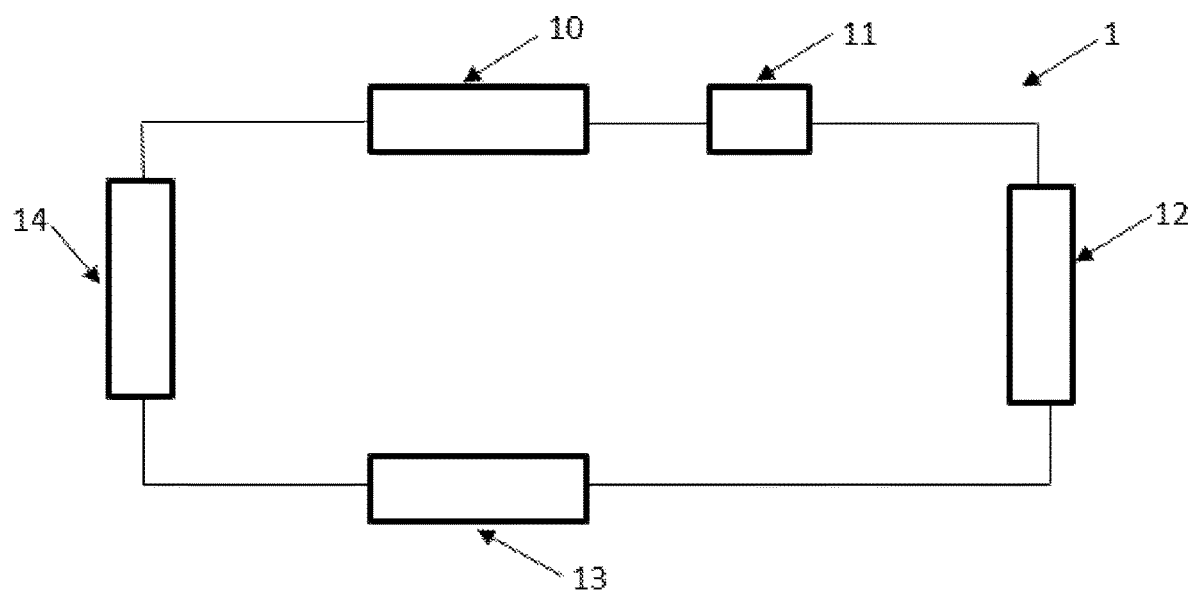
FIG. 2 shows a heat transfer system containing a vapour compression circuit, said circuit comprising an oil separator.
Figure 3:
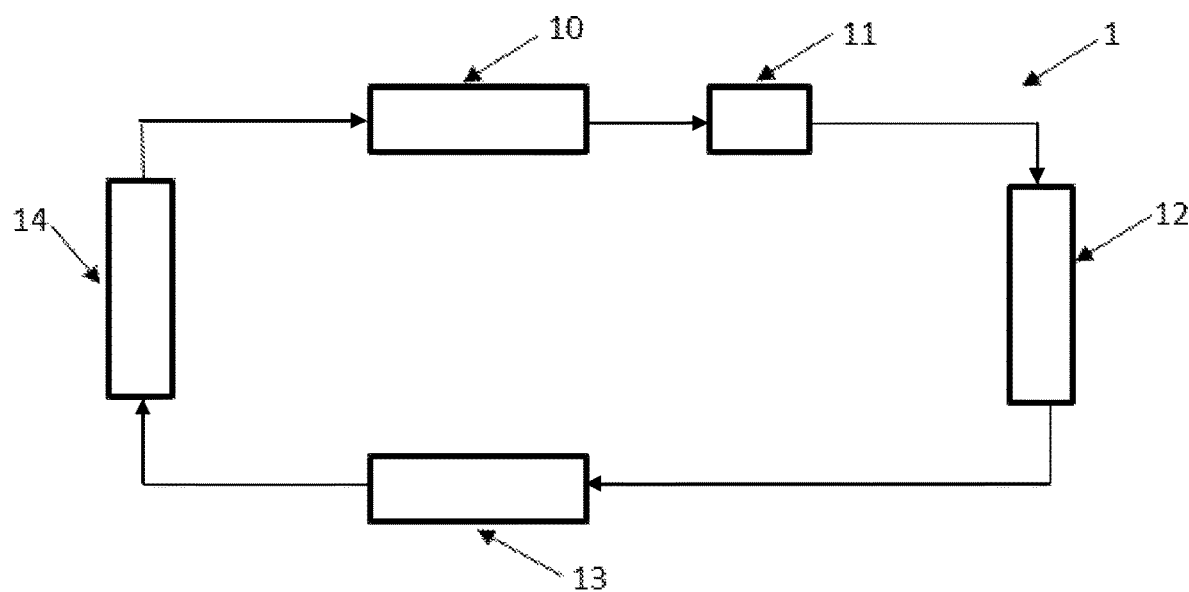
FIG. 3 shows a heat transfer system containing a vapour compression circuit, said circuit comprising an oil separator.

The present invention also relates to the use of an azeotropic composition or a heat transfer composition according to the invention, in a heat transfer system containing a vapour compression circuit, said circuit preferably comprising an oil separator, an exemplary embodiment of which is shown in FIG. 2 and in FIG. 3.

According to one embodiment, the heat transfer system constitutes:
an air conditioning system; or
a refrigeration system; or
a freezing system; or
a heat pump system.

The present invention also relates to a heat transfer method based on the use of a heat transfer system containing a vapour compression circuit comprising an azeotropic composition or the heat transfer composition according to the invention, said circuit preferably comprising an oil separator. The heat transfer process may be a method of heating or cooling a fluid or a body.

The azeotropic composition or the heat transfer composition may also be used in a process for producing mechanical work or electricity, particularly in accordance with a Rankine cycle.

The invention also relates to a heat transfer system comprising a vapour compression circuit containing an azeotropic composition or the heat transfer composition according to the invention, said circuit preferably containing an oil separator, and in particular a screw compressor.

According to one embodiment, this system is selected from mobile or stationary refrigeration, heating (heat pump), air conditioning and freezing systems, and thermal engines.

This may concern in particular a heat pump system, in which case the fluid or body that is heated (usually air and possibly one or more products, objects or organisms) is located in a room or a vehicle interior (for a mobile system). According to a preferred embodiment, it is an air conditioning system, in which case the fluid or body that is cooled (generally air and possibly one or more products, objects or organisms) is located in a room or vehicle interior (for a mobile system). It can be a refrigeration plant or a freezing facility (or cryogenic system), in which case the fluid or body that is cooled generally comprises air and one or more products, objects or organisms, located in a room or container.

In particular, the heat transfer system is a heat pump, or an air conditioning system, for example a chiller.

The invention also relates to a process for heating or cooling a fluid or a body through a vapour compression circuit containing a heat transfer fluid or a heat transfer composition, said method successively comprising evaporation of the fluid or heat transfer composition, compression of the fluid or heat transfer composition, condensation of the fluid or heat transfer composition, and expansion of the fluid or heat transfer composition, wherein the heat transfer fluid is the azeotropic composition according to the invention, or the heat transfer composition is as described above, said compression circuit preferably comprising an oil separator.

The invention also relates to a process for producing electricity through a heat engine, said method comprising successively the evaporation of the heat transfer fluid or a heat transfer composition, expansion of the fluid or heat transfer composition in a turbine for generating electricity, condensation of the fluid or heat transfer composition and compression of the fluid or heat transfer composition, wherein the heat transfer fluid is the azeotropic composition according to the invention and the heat transfer composition is as described above.

The vapour compression circuit 1, containing a fluid or a heat transfer composition according to the invention, comprises at least one evaporator 14, a preferably screw compressor 10, a condenser 12 and a pressure regulator, and transport lines of the fluid or heat transfer composition between these elements, and optionally an oil separator 11, and an expansion device 13. The evaporator 14 and the condenser 12 comprise a heat exchanger for heat exchange between the fluid or heat transfer composition and another fluid or body.

The evaporator used in the context of the invention may be an overheating evaporator or a flooded evaporator. In an overheated evaporator, all of the aforementioned fluid or heat transfer composition is evaporated at the evaporator outlet, and the vapour phase is superheated.

In a flooded evaporator, the fluid/liquid heat transfer composition does not completely evaporate. A flooded evaporator has a liquid phase and vapour phase separator.

Regarding a compressor, a single or multi-stage centrifugal compressor in particular or a mini centrifugal compressor may be used. Rotary, piston or screw compressors may also be used.

According to one embodiment, the vapour compression circuit comprises a centrifugal compressor, and preferably a centrifugal compressor and a flooded evaporator.

According to another embodiment, the vapour compression circuit comprises a screw compressor, preferably twin-screw or single-screw. In particular, the vapour compression circuit comprises a twin-screw compressor, which can implement a substantial flow of oil, for example up to 6.3 L/s.

A centrifugal compressor is characterized in that it uses rotating elements to radially accelerate the fluid or heat transfer composition; it typically comprises at least one rotor and a diffuser housed in an enclosure. The heat transfer fluid or heat transfer composition is introduced into the centre of the rotor and flows towards the periphery of the rotor while undergoing acceleration. Thus, on the one hand, the static pressure increases in the rotor, and especially on the other hand at the level of the diffuser, the speed is converted into an increase of the static pressure. Each rotor/diffuser assembly constitutes a compressor stage. Centrifugal compressors may comprise from 1 to 12 stages, depending on the desired final pressure and the volume of fluid to be treated.

The compression ratio is defined as the ratio of the absolute pressure of the output fluid or heat transfer composition to the absolute pressure of said fluid or composition at the inlet.

The rotational speed for large centrifugal compressors ranges from 3000 to 7000 revolutions per minute. Small centrifugal compressors (or mini-centrifugal compressors) generally operate at a rotation speed ranging from 40000 to 70000 revolutions per minute and comprise a small rotor (generally less than 0.15 m).

A multi-stage rotor can be used to improve the efficiency of the compressor and to limit the energy cost (compared to a single-stage rotor). For a two-stage system, the output of the first stage of the rotor feeds the input of the second rotor. Both rotors can be mounted on a single axis. Each stage can provide a fluid compression ratio of about 4 to 1, i.e. the output absolute pressure can be about four times the absolute suction pressure. Examples of two-stage centrifugal compressors, particularly for automotive applications, are described in U.S. Pat. No. 5,363,674.

The centrifugal compressor can be driven by an electric motor or by a gas turbine (for example powered by the exhaust gas of a vehicle, for mobile applications) or by gearing.

The system may include coupling of the expander with a turbine to generate electricity (Rankine cycle).

The system may also optionally comprise at least one heat transfer fluid circuit used to transmit the heat (with or without a change of state) between the circuit of the heat transfer fluid or the heat transfer composition, and the fluid or body to be heated or cooled.

The plant may also optionally include two or more vapour compression circuits containing identical or different heat transfer fluids/compositions. For example, the vapour compression circuits may be coupled together.

The vapour compression circuit operates in a conventional vapour compression cycle. The cycle comprises changing the state of the fluid/heat transfer composition from a liquid phase (or two-phase liquid/vapour) to a vapour phase at a relatively low pressure, and then compressing the fluid/vapour phase composition to a relatively high pressure, changing the state (condensation) of the fluid/heat transfer composition from the vapour phase to the liquid phase at a relatively high pressure, and reducing the pressure to restart the cycle.

In the case of a cooling process, heat from the fluid or the body, which is cooled (directly or indirectly through a heat transfer fluid), is absorbed by the fluid/heat transfer composition, during the evaporation of the latter, and at a relatively low temperature with respect to the environment. Cooling processes include air conditioning processes (with mobile systems, for example in vehicles, or stationary), refrigeration and freezing or cryogenics. In the field of air conditioning, examples include domestic, commercial or industrial air conditioning, where the equipment used is either chillers or direct expansion equipment. In the field of refrigeration, examples include domestic and commercial refrigeration, cold rooms, the food industry, refrigerated transport (lorries, boats).

In the case of a heating process, heat is transferred (directly or indirectly through a heat transfer fluid) from the fluid/the heat transfer composition, during the condensation thereof, to the fluid or to the body that is heated to a relatively high temperature relative to the environment. The system for implementing the heat transfer is called in this case "heat pump". This can concern medium and high temperature heat pumps.

It is possible to use any type of heat exchanger for the implementation of the heat transfer compositions (azeotropic) according to the invention, and in particular co-current heat exchangers or, preferably, counter-current heat exchangers.

However, according to a preferred embodiment, the invention anticipates that the cooling and heating processes, and the corresponding facilities, comprise a counter current heat exchanger, either the condenser or the evaporator. Indeed, the compositions according to the invention (azeotropic composition or heat transfer composition defined above) are particularly effective with countercurrent heat exchangers. Preferably, both the evaporator and the condenser comprise a counter current heat exchanger.

According to the invention, the term "counter current heat exchanger" is understood to mean a heat exchanger wherein heat is exchanged between a first fluid and a second fluid, the first fluid at the inlet of the exchanger exchanging heat with the second fluid at the outlet of the exchanger, and the first fluid at the outlet of the exchanger exchanging heat with the second fluid at the inlet of the exchanger.

For example, counter current heat exchangers include devices wherein the flow of the first fluid and the flow of the second fluid are in opposite or almost opposite directions. The exchangers operating in cross current mode with counter current tendency are also included among the counter current heat exchangers within the meaning of the present application.

Under different operating conditions (air conditioning, refrigeration, heat pump, etc.), the compositions according to the invention can advantageously induce overheating at the compressor (difference between temperature at the separator and temperature at the condenser) greater than that of HFO-1234yf and/or HFO-1234ze.

In "low temperature refrigeration" processes, the inlet temperature of the composition according to the invention (azeotropic or heat transfer composition) to the evaporator is preferably between −45° C. to −15° C., particularly between −40° C. to −20° C., more preferably between −35° C. to −25° C. and for example about −30° C.; and the temperature of the onset of condensation of the composition according to the invention (azeotropic or heat transfer composition) at the condenser is preferably between 25° C. to 80° C., especially between 30° C. to 60° C., more preferably between 35° C. to 55° C. and for example bout 40° C.

In "moderate temperature cooling" processes, the inlet temperature of the composition according to the invention (azeotropic or heat transfer composition) at the evaporator is preferably between −20° C. to 10° C., particularly between −15° C. to 5° C., more preferably between −10° C. to 0° C. and for example about −5° C.; and the temperature of the onset of condensation of the composition according to the invention (azeotropic or heat transfer composition) at the condenser is preferably between 25° C. to 80° C., especially between 30° C. to 60° C., more preferably between 35° C. to 55° C. and for example about 50° C. These processes can be refrigeration or air conditioning processes.

In "moderate temperature heating" processes, the inlet temperature of the composition according to the invention (azeotropic or heat transfer composition) to the evaporator is preferably from −20° C. to 10° C., especially from −15° C. to 5° C. more preferably between −10° C. to 0° C. and for example about −5° C.; and the temperature of the onset of condensation of the composition according to the invention (azeotropic or heat transfer composition) at the condenser is preferably from 25° C. to 80° C., especially between 30° C. to 60° C., more preferably between 35° C. to 55° C. and for example about 50° C.

In "high temperature heating" processes, the inlet temperature of the composition according to the invention (azeotropic or heat transfer composition) to the evaporator is preferably from −20° C. to 90° C., especially from −10° C. to 90° C. more preferably between 50° C. to 90° C. and for example about 80° C.; and the temperature of the onset of condensation of the composition according to the invention (azeotropic or heat transfer composition) at the condenser is preferably from 70° C. to 160° C., especially between 90° C. to 150° C., more preferably between 110° C. to 140° C. and for example about 135° C.

The compositions according to the invention are particularly significant in refrigerated transport.

Refrigerated transport entails any movement of perishable products under refrigerated space. Food or pharmaceutical products are an important part of perishable products.

Refrigerated transport can be carried out by truck, rail or boat, possibly using multi-platform containers that fit equally well on trucks, rails or boats.

In refrigerated transport, the temperature of refrigerated spaces is between −30° C. and 16° C. The refrigerant charge in transport by lorry, rail or multi-platform containers varies between 4 kg and 8 kg of refrigerant. The systems in the boats can contain between 100 and 500 kg.

The most used refrigerant to date is R404A.

The operating temperatures of the refrigerating plants depend on the refrigeration temperature requirements and the external climatic conditions. The same refrigeration system must be able to cover a wide temperature range of −30° C. to 16° C. and operate in both cold and hot climates.

The most restrictive condition at evaporation temperature is −30° C.

The compositions according to the invention can be used to replace various heat transfer fluids in various heat transfer applications, such as 1,1,1,2-tetrafluoroethane (R134a) or HFO-1234yf.

Oil Separator

According to the invention, the vapour compression circuit may comprise an oil separator.

According to one embodiment, the oil separator is located between the compressor and the condenser.

According to the invention, the oil separator may be a tank or a cylinder comprising at least one deflector or screen for collecting the oil.

According to one embodiment, the oil separator comprises a float/valve/needle mechanism. In this particular case, the oil, recovered in the separator, is stored in the lower part containing the float/valve/pointer mechanism. When the oil level is high enough to lift the float mechanism, the valve-needle system opens and allows the oil to re-enter the compressor housing(s). The oil return is carried out thanks to the pressure difference between that of the oil separator and that of the compressor housing (s).

The oil separator advantageously allows the release of the refrigerant to the condenser, and the return of the separated lubricating oil to the compressor.

The compression circuit according to the invention may comprise an oil return line between the oil separator and the inlet of the compressor.

In particular, the oil separator comprises an inlet valve (allowing in particular the entry of the composition of the invention), an outlet valve in the upper part of the separator (in particular for recovering a part of the refrigerant which will go to the condenser), and an outlet valve in the lower part of the separator (allowing in particular the exit of the oil for its return to the compressor).

Typically, the oil separators can implement at least one of the following techniques:
- coalescence: a phenomenon by which two identical but dispersed substances tend to reunite;
- centrifugation: this technique uses centrifugal force to separate fluids of different densities;
- speed reduction: this technique allows the heavier molecules to continue their trajectory, thanks to their inertia, while the lighter molecules disperse in the internal volume of the oil separator;
- change of direction: this technique associated with the previous one makes it possible to increase the separation efficiency of the oil droplets (heavy molecules) present in the vapour (light molecules). The oil droplets retain their initial trajectory, in particular because of their weight and their initial velocity, while the steam is directed towards the exit of the separator.

Coalescence can be performed using metal screens or coalescent cartridges.

Centrifugation can be performed using turbulators, helical systems or special arrangements of the separators (cyclone).

An oil separator can especially implement several of the aforementioned techniques.

Examples of the oil separators that are useful according to the invention, are CarlyTURBOIL range, Danfoss OUB, Emerson OS, Castel 5520 and 5540 series, Temprite separator and AC & R separators, Bitzer OAS separators for screw compressors.

The vapour compression circuit may further comprise an oil cooling system, and optionally an oil pump and/or an oil distribution system, located between the oil separator and the inlet of the compressor.

The oil pump can be used to remedy pressure losses and/or to allow the oil to reach a pressure higher than the discharge pressure of the compressor.

The oil cooling system can be used to cool the oil from the compressor and oil separator.

Flammability

Furthermore, the compositions according to the present invention have the advantage of having a flame propagation velocity of less than 10 cm/s, preferably less than 8 cm/s or even 7 cm/s or even 3 cm/s following the measurement method developed by Jabbour T—2004. Some compositions are even non-flammable.

The experimental set-up uses the vertical glass tube method (number of tube 2, length 150 cm, diameter 40 cm). The use of two tubes facilitates two tests with the same concentration at the same time.

The tubes are equipped with tungsten electrodes, which are placed at the bottom of each tube, 6.35 mm (¼ inch) apart and connected to a 15 kV and 30 mA generator.

The test method is developed in T. Jabbour's thesis, "Classification of flammability of refrigerants based on the fundamental flame velocity" under the direction of Denis Clodic. Thesis, Paris, 2004.

For example, the flame propagation speed for the composition HFO-1234yf/R134a/R152a: 78.9/7.0/14.1% by weight is 4.75 cm/s and that of the composition HFO-1234yf/R134a/R152a: 74.2/7.7/18.1% by mass is 6 cm/s.

All the embodiments described above can be combined with each other. Thus, each preferred azeotropic composition can be combined with each additive and especially with each preferred polyol ester (esters A, B, C or D), in the various proportions mentioned. The various preferred compositions can be used in the various applications described above.

The following examples illustrate the invention but without limiting it.

Examples

Supplier of POE Triton SE 55 d Oil: FUCHS

In an oil separator integrated in a screw compressor, the oil is recovered in the lower part of the separator. In this example, the amounts of refrigerant trapped by the oil in the separator are analysed.

The coolant/oil mixture in the separator is at a temperature Ts (which is also the temperature of the refrigerant at the outlet of the compressor) and the pressure in the separator is equal to the refrigerant vapour saturation pressure at the condenser inlet (Pcond). Therefore, this results in a system that works at a condensing temperature (Tcond), which is the saturation temperature of the refrigerant alone at the corresponding Pcond pressure.

In general, the analysis of a typical refrigerant/oil diagram (as shown for example in FIG. 1 for R134a) indicates that, at constant pressure (Pcond), the refrigerant concentration in the oil decreases when the temperature of the mixture (oil/refrigerant, Ts) increases and moves away from the saturation temperature of the refrigerant alone (Tcond), the difference between Ts and Tcond representing the overheating at the outlet of the compressor.

Temperature Tcond, pressure Pcond and temperature Ts in the oil separator are defined by the operating needs of the system. The percentage of oil in the refrigerant will therefore be deduced from the corresponding refrigerant/oil diagram at the pressure Pcond and at temperature Ts. This method makes it possible to compare the refrigerants indirectly by watching overheating at the outlet of the compressor.

Case of an air conditioning system that operates under the following conditions in heating mode (heat pump):
Condensation temperature Tcond=70° C.;
Evaporation temperature: 0° C.;
Overheating on the evaporator: 0° C.;
Under cooling: 0° C.;
Compressor efficiency: 75%;
Reference case: R134a and POE Triton SE 55;

According to the diagram of FIG. 1, for a temperature (Ts) in the separator of 87° C. and a pressure of 21 bar abs, the superheat at the outlet of the compressor is 17° C., and this gives an oil percentage of 75% in weight (25% in weight of R134a in the oil).

For a HFO-1234yf/POE Triton SE 55 oil mixture, under the same operating conditions as described above, the condenser pressure is about 20.5 bar abs and the superheat at the compressor outlet is about 4.8° C.

HFO-1234yf at saturation pressure very close to R134a but low overheating. As a result, the refrigerant concentration in the liquid phase of the oil separator will be greater than 30%, or even 35%, in weight.

Consequently, for the same oil/coolant liquid flow rate, increase of the percentage of refrigerant in the oil of the separator resulted in a decrease in the amount of lubricating oil circulating in the compressor and also in a decrease of the viscosity of the oil/refrigerant mixture. Therefore, direct replacement of R134a with HFO-1234yf may damage the compressor (lubrication problem, low viscosity) and decrease performance.

The table below provides the overheat value at the compressor output compared to the condensing temperature under the same operating conditions, described above for R134a and HFO-1234yf, for different mixtures:

The ratio A corresponds to the following relation:

$$A = \left[ \frac{\text{overheating of compressor of the mixture} - \text{overheating of compressor of } 1234yf}{\text{overheating of the compressor of } 1234yf} \right] \times 100$$

| | | | P (bar) | | Temperature (° C.) | | | | |
|---|---|---|---|---|---|---|---|---|---|
| | | | | | evaporator | compressor | condenser vapour | overheating | |
| | | | condenser | evaporator | inlet | output | saturation | compressor | A |
| | HFO-1234yf | | 20.45 | 3.16 | 0.0 | 74.8 | 70.0 | 4.8 | 0 |
| | HFO-1234ze | | 16.11 | 2.17 | 0.0 | 77.2 | 70.0 | 7.2 | 50 |
| | R134a | | 21.17 | 2.93 | 0.0 | 87.6 | 70.0 | 17.6 | 266 |
| R1234yf | R134a | R152a | | | | | | | |
| 81.5 | 6.5 | 12.0 | 20.90 | 3.18 | 0.0 | 79.1 | 70.0 | 9.0 | 88 |
| 80.5 | 7.5 | 12.0 | 20.92 | 3.18 | 0.0 | 79.2 | 70.0 | 9.2 | 90 |
| 79.5 | 8.5 | 12.0 | 20.95 | 3.18 | 0.0 | 79.3 | 70.0 | 9.3 | 93 |
| 78.5 | 9.5 | 12.0 | 20.97 | 3.18 | 0.0 | 79.4 | 70.0 | 9.4 | 95 |
| 77.5 | 10.5 | 12.0 | 21.00 | 3.18 | 0.0 | 79.6 | 70.0 | 9.5 | 98 |
| 79.5 | 6.5 | 14.0 | 20.90 | 3.18 | 0.0 | 79.6 | 70.0 | 9.6 | 100 |
| 78.5 | 7.5 | 14.0 | 20.93 | 3.18 | 0.0 | 79.8 | 70.0 | 9.7 | 102 |
| 77.5 | 8.5 | 14.0 | 20.95 | 3.18 | 0.0 | 79.9 | 70.0 | 9.9 | 105 |
| 76.5 | 9.5 | 14.0 | 20.97 | 3.18 | 0.0 | 80.0 | 70.0 | 10.0 | 108 |

-continued

|  |  |  | P (bar) | | Temperature (° C.) | | | | |
|---|---|---|---|---|---|---|---|---|---|
|  |  |  | condenser | evaporator | evaporator inlet | compressor output | condenser vapour saturation | overheating compressor | A |
| 75.5 | 10.5 | 14.0 | 20.99 | 3.18 | 0.0 | 80.1 | 70.0 | 10.1 | 110 |
| 77.5 | 6.5 | 16.0 | 20.90 | 3.17 | 0.0 | 80.2 | 70.0 | 10.2 | 112 |
| 76.5 | 7.5 | 16.0 | 20.92 | 3.17 | 0.0 | 80.4 | 70.0 | 10.3 | 115 |
| 75.5 | 8.5 | 16.0 | 20.94 | 3.17 | 0.0 | 80.5 | 70.0 | 10.5 | 117 |
| 74.5 | 9.5 | 16.0 | 20.96 | 3.17 | 0.0 | 80.6 | 70.0 | 10.6 | 120 |
| 73.5 | 10.5 | 16.0 | 20.98 | 3.17 | 0.0 | 80.7 | 70.0 | 10.7 | 122 |

The azeotropic compositions according to the invention advantageously have a compressor superheat higher than HFO-1234yf alone, and especially a coefficient A, as defined above, of greater than 80%, or even greater than 100%, in relation to HFO-1234yf alone.

Thus, the mixtures according to the invention advantageously can reduce (and/or avoid) the quantity of refrigerant trapped in the lubricating oil in relation to HFO-1234yf alone, and therefore increase the efficiency of the system due to higher refrigerant circulation in the system. In addition, with the mixtures of the invention, the amount of lubricating oil recovered by the separator being higher than with the HFO-1234yf, a better lubrication of the compressor is obtained.

The invention claimed is:

1. An azeotropic composition comprising between 76% to 79% weight of HFO-1234yf, between 12% to 15% weight of HFC-152a, and between 7% to 9% weight of HFC-134a, in relation to a total weight of the azeotropic composition, said azeotropic composition having a boiling point between −40.00° C. and 70.00° C., at a pressure of between 0.5 and 21.0 bar abs (±0.5%), wherein the global warming potential of the azeotropic composition is at most 150.

2. The azeotropic composition according to claim 1, comprising 77.5% (±0.2%) weight of HFO-1234yf, 14% (±0.2%) weight of HFC-152a, and 8.5% (±0.2%) weight of HFC-134a, in relation to the total weight of the azeotropic composition, said azeotropic composition having a boiling point between −40.00° C. and 70.00° C., at a pressure of between 0.5 and 21.0 bar abs (±0.5%).

3. The azeotropic composition according to claim 1, comprising 77.5% (±0.2%) weight of HFO-1234yf, 14% (±0.2%) weight of HFC-152a and 8.5% (±0.2%) weight of HFC-134a, in relation to the total weight of the azeotropic composition, said azeotropic composition having a boiling point of 26.97° C. (±0.50° C.) at a pressure of 7.3 bar abs (±0.5%).

4. A heat transfer composition comprising the azeotropic composition according to claim 1, and at least one additive, selected from nanoparticles, stabilizers, surfactants, tracer agents, fluorescent agents, odourizing agents, lubricants, and solubilising agents.

5. A heat transfer system containing a vapour compression circuit containing the azeotropic composition of claim 1.

6. A heat transfer system comprising a vapour compression circuit containing the azeotropic composition according to claim 1, said circuit containing an oil separator.

7. The heat transfer system according to claim 6, selected from mobile or stationary heat pump heating, air conditioning, refrigeration, freezing system and thermal engines.

8. A process of heating or cooling a fluid or a body through a vapour compression circuit containing a heat transfer composition, said process comprising successively fluid evaporation or of the heat transfer composition, compression of the fluid or heat transfer composition, fluid condensation or heat transfer composition, and fluid expansion or heat transfer composition, wherein the heat transfer composition is that according to claim 1.

9. A heat transfer system comprising a vapour compression circuit containing an azeotropic composition, said circuit containing an oil separator and a screw compressor, wherein the azeotropic composition comprises between 74 to 81.5 weight of HFO-1324yf, between 6.5 to 10.5% weight of HFC-134a, and between 12 to 16% weight of HFC-152a, in relation to a total weight of the azeotropic composition, said azeotropic composition having a boiling point between −40.00° C. and 70.00° C., at a pressure between 0.5 and 21.0 bar abs (±0.5%), wherein the global warming potential of the azeotropic composition is at most 150.

* * * * *